(12) United States Patent
Cho et al.

(10) Patent No.: US 12,039,946 B2
(45) Date of Patent: Jul. 16, 2024

(54) DISPLAY APPARATUS AND METHOD FOR CONTROLLING SAME

(71) Applicant: SAMSUNG ELECTRONICS CO., LTD., Suwon-si (KR)

(72) Inventors: Seungki Cho, Suwon-si (KR); Daeeun Hyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/105,520

(22) Filed: Feb. 3, 2023

(65) Prior Publication Data

US 2023/0186868 A1 Jun. 15, 2023

Related U.S. Application Data

(63) Continuation of application No. PCT/KR2021/010671, filed on Aug. 11, 2021.

(30) Foreign Application Priority Data

Sep. 22, 2020 (KR) ........................ 10-2020-0122163

(51) Int. Cl.
  *G09G 3/36* (2006.01)
  *A47G 1/02* (2006.01)

(52) U.S. Cl.
  CPC .................. *G09G 3/36* (2013.01); *A47G 1/02* (2013.01); *G09G 2320/0686* (2013.01);
  (Continued)

(58) Field of Classification Search
  CPC ............ G09G 3/36; G09G 2320/0686; G09G 2340/045; G09G 2340/0464;
  (Continued)

(56) References Cited

U.S. PATENT DOCUMENTS 6,560,027 B2 5/2003 Meine
10,112,539 B2 * 10/2018 Kameshima ........... B60K 35/00
(Continued)

FOREIGN PATENT DOCUMENTS

JP         6031258      10/2016
JP       2020-60628      4/2020
(Continued)

OTHER PUBLICATIONS

International Search Report mailed Nov. 24, 2021 in PCT application PCT/KR2021/01067, 7 pages.
(Continued)

*Primary Examiner* — Amy Onyekaba
(74) *Attorney, Agent, or Firm* — Nixon & Vanderhye, P.C.

(57) ABSTRACT

An example display apparatus includes a mirror display having adjustable reflectivity; a memory in which is stored, for each of one or more applications, information pertaining to the reflectivity corresponding to the application; and a processor that, when a user command for displaying the application is input, displays the application on the mirror display and adjusts, based on the reflectivity corresponding to the application among the one or more applications, the reflectivity of the region of the mirror display in which the application is displayed.

13 Claims, 32 Drawing Sheets

(52) U.S. Cl.
CPC ............... *G09G 2340/045* (2013.01); *G09G 2340/0464* (2013.01); *G09G 2354/00* (2013.01)

(58) Field of Classification Search
CPC .. G09G 2354/00; G09G 5/14; G09G 2340/04; G09G 2340/12; A47G 1/02; G06F 3/14; G09F 19/16
See application file for complete search history.

(56) References Cited

U.S. PATENT DOCUMENTS

| | | | |
|---|---|---|---|
| 10,297,037 B2 | 5/2019 | Shin | |
| 10,440,319 B2 | 10/2019 | Han et al. | |
| 10,558,079 B2 | 2/2020 | Jung et al. | |
| 10,564,413 B2* | 2/2020 | Lin | G06F 3/0304 |
| 2012/0293733 A1 | 11/2012 | Li et al. | |
| 2015/0220299 A1* | 8/2015 | Kim | G06F 3/1446 |
| | | | 345/1.3 |
| 2016/0019868 A1* | 1/2016 | Park | G09G 5/391 |
| | | | 345/428 |
| 2016/0231918 A1* | 8/2016 | Shin | G06F 3/048 |
| 2018/0059774 A1* | 3/2018 | Lee | G09G 5/10 |
| 2018/0091772 A1* | 3/2018 | Han | G06F 3/0484 |
| 2018/0157036 A1* | 6/2018 | Choi | G02B 27/0101 |
| 2018/0211635 A1* | 7/2018 | Ishibashi | G06T 11/00 |
| 2018/0224678 A1* | 8/2018 | Jung | G02F 1/1347 |
| 2018/0322845 A1* | 11/2018 | Machida | G02B 27/0172 |
| 2019/0135197 A1* | 5/2019 | Kanaya | G06F 3/147 |
| 2019/0217782 A1 | 7/2019 | Weller et al. | |
| 2019/0227637 A1* | 7/2019 | Rantala | E03C 1/057 |
| 2020/0078640 A1* | 3/2020 | Putnam | A61B 5/743 |
| 2020/0164809 A1 | 5/2020 | Englander et al. | |
| 2021/0193085 A1* | 6/2021 | Haas | G09G 5/10 |
| 2021/0228969 A1* | 7/2021 | Putnam | H04M 1/72409 |
| 2021/0358181 A1* | 11/2021 | Suzuki | G09G 5/377 |
| 2022/0050655 A1* | 2/2022 | Chiang | H04N 21/4122 |
| 2022/0192346 A1* | 6/2022 | Mouizina | H04N 5/272 |

FOREIGN PATENT DOCUMENTS

| | | |
|---|---|---|
| KR | 10-2016-0039997 | 4/2016 |
| KR | 10-1613038 | 4/2016 |
| KR | 10-2016-0096853 | 8/2016 |
| KR | 10-2016-0146263 | 12/2016 |
| KR | 10-2017-0101158 | 9/2017 |
| KR | 10-2018-0035434 | 4/2018 |
| KR | 10-2020-0015102 | 2/2020 |

OTHER PUBLICATIONS

Written Opinion mailed Nov. 24, 2021 in PCT application PCT/KR2021/010671, 4 pages.

* cited by examiner

110

110

DISPLAY APPARATUS AND METHOD FOR CONTROLLING SAME

CROSS-REFERENCE TO RELATED APPLICATIONS

This application is a continuation of International Application No. PCT/KR2021/010671 designating the United States, filed on Aug. 11, 2021, in the Korean Intellectual Property Receiving Office, and claiming priority to Korean Patent Application No. 10-2020-0122163, filed on Sep. 22, 2020, in the Korean Intellectual Property Office, the disclosures of which are incorporated by reference herein in their entireties.

BACKGROUND

Field

The disclosure relates to a display apparatus and a method for controlling the same, and for example, to a display apparatus including a mirror display and a method for controlling the same.

Description of Related Art

In recent years, various electronic devices have been developed in accordance with the development of electronic technology. For example, a mirror display apparatus having a mirror display has been recently developed.

A mirror display apparatus may perform a display function of displaying various images while performing a mirror function by reflecting light incident on the display apparatus from the outside.

However, the mirror display apparatus is unable to provide an optimal service based on a feature of an application that provides an image or the like.

SUMMARY

Embodiments of the disclosure provide a display apparatus which may control reflectivity of a region on a mirror display, where an application is displayed for each region, and a method for controlling the same.

According to an example embodiment of the disclosure, a display apparatus includes: a mirror display having adjusted reflectivity; a memory storing, for each of one or more applications, information on reflectivity corresponding to the application; and a processor displaying the application on the mirror display when receiving a user command for displaying the application, and adjusting reflectivity of a region on the mirror display, where the application is displayed, based on the reflectivity corresponding to the application among the one or more applications.

The memory may, for example, store information on reflectivity corresponding to a first application and reflectivity corresponding to a second application, and the processor may display the first and second applications on the mirror display, respectively, adjust reflectivity of a region on the mirror display, where the first application is displayed, based on the reflectivity corresponding to the first application, and adjust reflectivity of a region on the mirror display, where the second application is displayed, based on the reflectivity corresponding to the second application, and the reflectivity corresponding to the first application may be different from the reflectivity corresponding to the second application.

The processor may, for example, adjust the reflectivity of the region where the application is displayed based on the reflectivity corresponding to the application and location of the region where the application is displayed.

The processor may, for example, adjust the reflectivity of the region where the application is displayed based on the reflectivity corresponding to the application when the application is displayed in an edge region of the mirror display, and adjust the reflectivity of the region where the application is displayed based a predetermined reflectivity when the application is displayed in a central region of the mirror display, and the reflectivity corresponding to the application is smaller than the predetermined reflectivity.

The processor may, for example, adjust the reflectivity of the region where the application is displayed based on the reflectivity corresponding to the application and a size of the region where the application is displayed.

The processor may, for example, adjust the reflectivity of the region where the application is displayed based on the reflectivity corresponding to the application when the application is displayed on the mirror display while having a size smaller than a predetermined size, and adjust the reflectivity of the region where the application is displayed based on a predetermined reflectivity when the application is displayed on the mirror display while having a size of the predetermined size or larger, and the reflectivity corresponding to the application is smaller than the predetermined reflectivity.

The processor may, for example, display the application in another region according to a user command when receiving the user command for moving the application to another region of the mirror display, and adjust the reflectivity of the region where the application is displayed based on the reflectivity corresponding to the application and a location of the region on the mirror display, to which the application is moved.

The processor may, for example, change and display a size of the application when receiving a user command for changing a size of the region where the application is displayed, and adjust the reflectivity of the region where the application is displayed based on the reflectivity corresponding to the application and the changed size of the application.

The mirror display may, for example, have the reflectivity adjusted for a plurality of reflective regions, and the processor may determine the region where the application is displayed among the plurality of regions based on the location and size of the application to be displayed, display the application in the determined region, and adjust reflectivity of the determined region based on the reflectivity corresponding to the application.

The processor may, for example, determine a matched region as the region where the application is displayed when determining that the display region of the application determined based on the location and size of the application to be displayed matches with at least one region among the plurality of regions, and change at least one of the location and size of the display region of the application for the display region of the application to match with at least one region among the plurality of regions when determining that the display region of the application does not match with at least one region among the plurality of regions, and determine the changed display region as the region where the application is displayed.

According to an example embodiment of the disclosure, a method for controlling a display apparatus that includes a mirror display having adjustable reflectivity includes: displaying an application on the mirror display when a user command for displaying the application is input; and adjusting reflectivity of a region on the mirror display, where the application is displayed, based on reflectivity corresponding to the application among one or more applications, based on information on the reflectivity corresponding to the application for each of the one or more applications.

The display apparatus may, for example, store information on reflectivity corresponding to a first application and reflectivity corresponding to a second application, and, in the displaying, the first and second applications may be displayed on the mirror display, respectively, in the adjusting, a region on the mirror display, where the first application is displayed, may have adjusted reflectivity based on the reflectivity corresponding to the first application, and a region on the mirror display, where the second application is displayed, may have adjusted reflectivity based on the reflectivity corresponding to the second application, and the reflectivity corresponding to the first application may be different from the reflectivity corresponding to the second application.

In the adjusting, the region where the application is displayed may, for example, have adjusted reflectivity based on the reflectivity corresponding to the application and a location of the region where the application is displayed.

In the adjusting, the region where the application is displayed may, for example, have adjusted reflectivity based on the reflectivity corresponding to the application when the application is displayed in an edge region of the mirror display, and the region where the application is displayed may have adjusted reflectivity based on a predetermined reflectivity when the application is displayed in a central region of the mirror display, and the reflectivity corresponding to the application is smaller than the predetermined reflectivity.

In the adjusting, the region where the application is displayed may, for example, have adjusted reflectivity based on the reflectivity corresponding to the application and a size of the region where the application is displayed.

In the adjusting, the region where the application is displayed may, for example, have adjusted reflectivity based on the reflectivity corresponding to the application when the application is displayed on the mirror display while having a size smaller than a predetermined size, and the region where the application is displayed may have adjusted reflectivity based on a the predetermined reflectivity when the application is displayed on the mirror display while having a size of the predetermined size or larger, and the reflectivity corresponding to the application is smaller than the predetermined reflectivity.

The method may, for example, further include: displaying the application in another region according to a user command when receiving the user command for moving the application to another region of the mirror display; and adjusting the reflectivity of the region where the application is displayed based on the reflectivity corresponding to the application and location of the region on the mirror display, where the application is moved.

The method may, for example, further include: changing and displaying a size of the application when receiving a user command for changing the size of the region where the application is displayed; and adjusting the reflectivity of the region where the application is displayed based on the reflectivity corresponding to the application and the changed size of the application.

The mirror display may, for example, have the reflectivity adjusted for the plurality of reflective regions, and the method may further include: determining the region where the application is displayed among the plurality of regions based on the location and size of the application to be displayed; displaying the application in the determined region; and adjusting reflectivity of the determined region based on the reflectivity corresponding to the application.

In the determining, a matched region may, for example, be determined as the region where the application is displayed when it is determined that the display region of the application determined based on the location and size of the application to be displayed matches with at least one region among the plurality of regions, and at least one of the location and size of the display region of the application may be changed for the display region of the application to match with at least one region among the plurality of regions when it is determined that the display region of the application does not match with at least one region among the plurality of regions, and the changed display region may be determined as the region where the application is displayed.

According to the various example embodiments of the disclosure, a display apparatus may provide a user with a natural screen based on features of an application while preventing or reducing lower image quality of the application.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
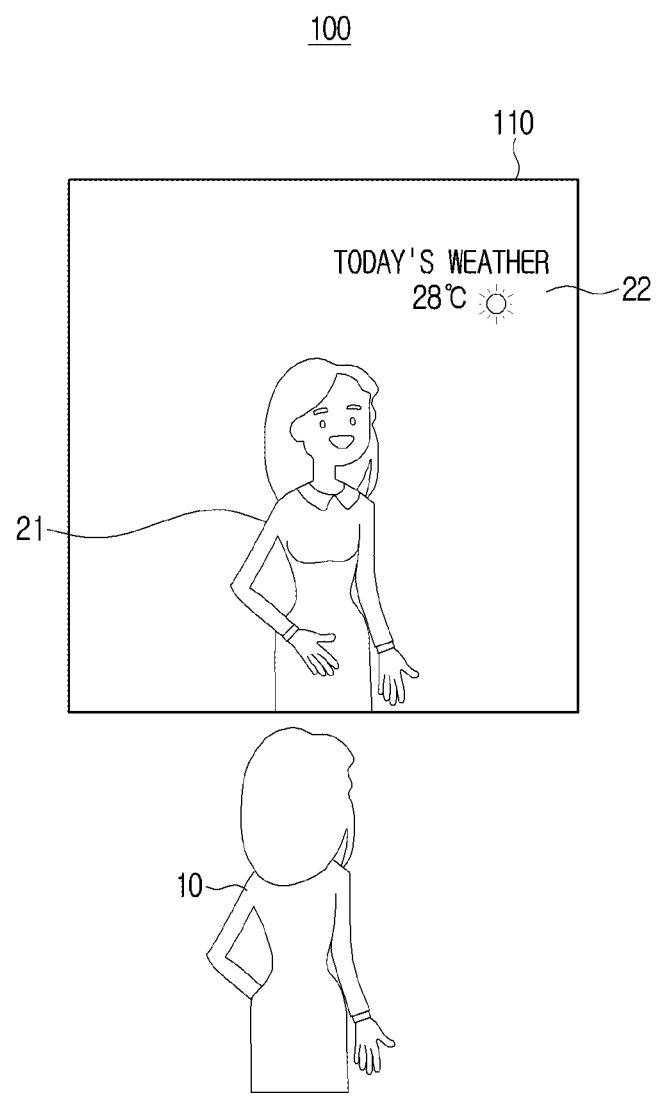
FIG. 1 is a view for explaining an example display apparatus according to various embodiments.

Hereinafter, various example embodiments of the disclosure will be described with reference to the accompanying drawings. However, it is to be understood that technologies mentioned in the disclosure are not limited to specific embodiments, and include all modifications, equivalents, and alternatives according to the embodiments of the disclosure. Throughout the accompanying drawings, similar components are denoted by similar reference numerals.

In the disclosure, an expression "have," "may have," "include," "may include" or the like, indicates existence of a corresponding feature (for example, a numerical value, a function, an operation or a component such as a part), and does not exclude existence of an additional feature.

In the disclosure, an expression "A or B," "at least one of A and/or B," "one or more of A and/or B" or the like, may include all possible combinations of items enumerated together. For example, "A or B," "at least one of A and B" or "at least one of A or B" may indicate all of 1) a case in which at least one A is included, 2) a case in which at least one B is included, or 3) a case in which both of at least one A and at least one B are included.

Expressions "first," "second" and the like, used in the disclosure, may indicate various components regardless of the sequence and/or importance of the components. These expressions are used only to distinguish one component from another component, and do not limit the corresponding component.

Any component (for example, a first component) mentioned to be "(operatively or communicatively) coupled with/to" or "connected to" another component (for example, a second component) may be directly coupled to another component or coupled to another component through still another component (for example, a third component). On the other hand, any component (for example, the first component) mentioned to be "directly coupled to" or "directly connected to" another component (for example, the second component) no other component (for example, a third component) is present between the any component and the other component.

In the embodiments, a "module" or a "~er/~or" may perform at least one function or operation, and be implemented by hardware or software or be implemented by a combination of hardware and software. In addition, a plurality of "modules" or a plurality of "~ers/~ors" may be integrated in at least one module and be implemented by at least one processor (not shown) except for a "module" or a "~er/or" that is implemented by specific hardware.

An expression "configured (or set) to" used in the disclosure may be replaced by an expression "suitable for," "having the capacity to," "designed to," "adapted to," "made to" or "capable of," based on a situation. The expression "configured (or set) to" may not necessarily indicate "specifically designed to" in hardware. Instead, the expression a device "configured to" in any situation may indicate that the device may "perform-" together with another device or component. For example, "a processor configured (or set) to perform A, B and C" may indicate a dedicated processor (for example, an embedded processor) for performing the corresponding operations and/or a generic-purpose processor (for example, a central processing unit (CPU) or an application processor) that may perform the corresponding operations by executing one or more software programs stored in a memory apparatus.

Meanwhile, in the disclosure, "predetermined reflectivity" may refer to predetermined reflectivity of a display apparatus or that of a mirror display apparatus, and "reflectivity corresponding to an application" may refer to predetermined reflectivity preset for each individual application.

FIG. 1 is a view for explaining an example display apparatus according to various embodiments.

Referring to FIG. 1, a display apparatus 100 may use a mirror display 110 to perform a mirror function and a display function of displaying various images, screens, and the like. Here, the image, the screen, or the like may be provided through an application.

For example, as shown in FIG. 1, the display apparatus 100 may reflect light incident from the outside to display a reflection 21 of a user 10 located in front of the display apparatus 100, and display weather information 22 provided by a weather application.

Meanwhile, according to an embodiment of the disclosure, the display apparatus 100 may adjust reflectivity of a region on the mirror display 110, where an application is displayed, based on reflectivity set for each application.

Here, the reflectivity may, for example, refer to reflectivity for external light incident to the mirror display 110.

For example, the display apparatus 100 may drive the mirror display 110 for a first region to have first reflectivity when an image provided by a video application (or a video streaming service application) is displayed in the first region of the mirror display 110, and drive the mirror display 110 for a second region to have second reflectivity when weather information provided by the weather application is displayed in the second region of the mirror display 110.

As such, according to an embodiment of the disclosure, the display apparatus 100 may adjust the reflectivity of a region where an application is displayed for each application, in consideration of an application feature.

For example, the display apparatus 100 may drive the mirror display 110 for a region where corresponding content is displayed to have reflectivity of 0% in that it is appropriate to minimize (or reduce) an image quality loss due to external light reflection for videos and images, and drive the mirror display 110 for a region where corresponding content is displayed to have reflectivity of 50% in that it is appropriate to provide information such as weather and time naturally blended with a user appearance or a surrounding background, reflected in a mirror.

Therefore, according to an embodiment of the disclosure, the display apparatus 100 may provide a natural screen to the user based on the application feature while preventing or reducing lower image quality of an application.

Figure 2:
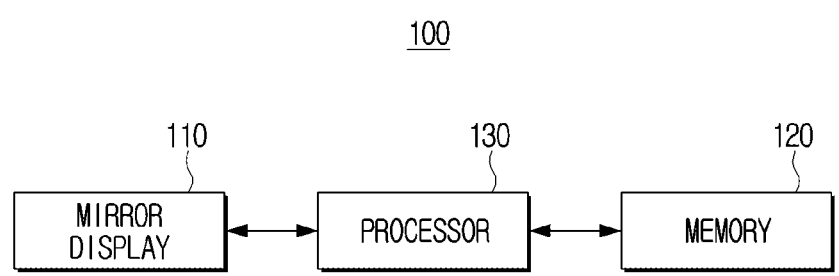
FIG. 2 is a block diagram illustrating a configuration of an example display apparatus according to various embodiments.

FIG. 2 is a block diagram illustrating a configuration of an example display apparatus according to various embodiments.

Referring to FIG. 2, the display apparatus 100 may include a mirror display 110, a memory 120, and a processor 130.

The mirror display 110 may perform a mirror function, and perform a display function of displaying an image, a screen, or the like.

That is, the mirror display 110 may reflect light incident from the outside, also output light emitted from a plurality of pixels included in the mirror display 110 and transmit the same to the outside.

In this case, the mirror display 110 may have adjusted reflectivity.

First, the mirror display 110 may have adjusted reflectivity for each pixel. That is, the mirror display 110 may include a plurality of pixels for displaying an image, and the mirror display 110 may here have adjusted reflectivity for each pixel.

The mirror display 110 may also have adjusted reflectivity for each region. That is, the mirror display 110 may be divided into a plurality of regions, and each region may correspond to some pixels among all the pixels of the mirror display 110. In this case, the mirror display 110 may have adjusted reflectivity for each region.

Here, a size of the region may be larger than that of the pixels included in the mirror display 110.

Figure 3A:
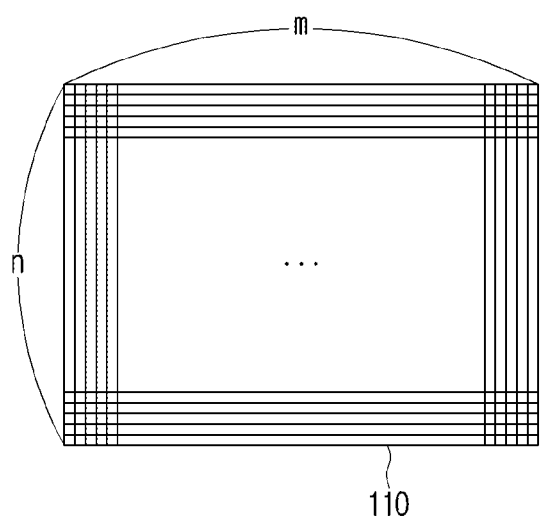
FIGS. 3A and 3B are views for explaining sizes of a plurality of regions according to various embodiments.
Figure 3B:
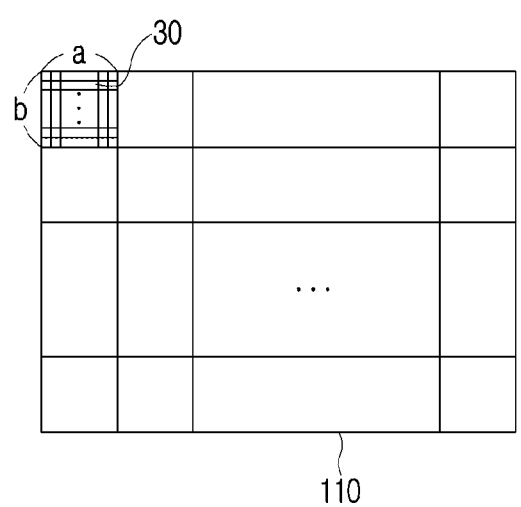

For example, as shown in FIG. 3A, the mirror display 110 may be assumed to include m×n pixels. In this case, as shown in FIG. 3B, a region 30 may have a size corresponding to a size of a×b pixels.

Meanwhile, reflectivity may, for example, refer to reflectivity for external light incident to the mirror display 110.

For example, the mirror display 110 may include a liquid crystal (or a liquid crystal layer). In this case, an arrangement state of the liquid crystal may be controlled based on a voltage applied to the liquid crystal, and the mirror display 110 may thus have adjusted reflectivity.

For example, some regions of the mirror display 110 may be driven to have a reflectivity of 0%, another region may be driven to have a reflectivity of 50%, and still another region may be driven to have reflectivity of 100%.

Meanwhile, the reflectivity may be inversely proportional to transmittance.

That is, the region of the mirror display 110, having a reflectivity of 100%, may reflect most of external light, thus perform a mirror function, and have a transmittance of 0%. In addition, a region of the mirror display 110, having the reflectivity of 0%, may reflect no external light, output light emitted from the pixels corresponding to the region and transmit the same to the outside, thus performing a display function, and have a transmittance of 100%. In addition, a region of the mirror display 110, having a reflectivity of 50%, may partially reflect external light, partially output light emitted from the pixels corresponding to the region and transmit the same to the outside, thus performing a mirror function and a display function together, and have a transmittance of 50%.

Therefore, in the present disclosure, adjusting the reflectivity of the mirror display 110 may have the same meaning and effect as adjusting the transmittance of the mirror display 110.

The memory 120 may store various instructions, programs, or data related to an operation of the display apparatus 100.

To this end, the memory 110 may be implemented as a non-volatile memory, a volatile memory, a flash-memory, a hard disk drive (HDD), a solid state drive (SSD), or the like. Here, the memory 120 may be accessed by the processor 130, and the readout, recording, correction, deletion, update, and the like of data may be performed by the processor 130.

In particular, the memory 120 may store at least one application. In this case, the application may be stored in the memory 120 when the display apparatus 100 is manufactured, or may be downloaded from a server (not shown) providing the application and stored in the memory 120.

In addition, the memory 120 may store information on reflectivity (or reflectivity information) corresponding to an application for each of one or more applications.

That is, the memory 120 may store information on reflectivity set for each application for a plurality of applications.

In this case, the reflectivity information may, for example, be included in metadata for the application.

That is, the memory 120 may store metadata including various information on an application, such as the name, version, and description of the application. Here, the information on reflectivity may also be included in the metadata.

For example, an application manufacturer may set the information on reflectivity of an application when manufacturing the application, and include the information on the set reflectivity in the metadata for the application.

In this case, the metadata may be stored in the memory 120 together with the application when the display apparatus 100 is manufactured, and also may be downloaded together with the application from the server (not shown) providing the application and stored in the memory 120.

Meanwhile, the information on reflectivity that is stored in the memory 120 may be changed based on a user command.

The processor 130 (e.g., including processing circuitry) may be electrically connected to the mirror display 110 and the memory 120 to control the overall operations and functions of the display apparatus 100.

Here, the processor 130 may include a central processing unit (CPU) or an application processor (AP), and execute one or more software programs stored in the memory 120 based on one or more instructions stored in the memory 120.

First, the processor 130 may display an application on the mirror display 110 when receiving a user command for displaying the application, adjust the reflectivity of a region on the mirror display 110, where the application is displayed, based on the reflectivity corresponding to the application among one or more applications.

Here, displaying the application may, for example, refer to displaying a screen (or window) including various information such as a video or an image provided by the executed application.

In addition, a user command for displaying the application may include a user command for executing the application or a user command for displaying the application executed in a background on the mirror display 110.

In addition, the location and size of the region where the application is displayed may be set as defaults.

That is, the application may be set to be displayed while having a default size in a default location. For example, an application may be set to be displayed in a full screen of the mirror display 110, or displayed in a partial region of the mirror display 110 while having a specific size in a specific location.

Meanwhile, the default location and size may be changed based on a user command, and the location and size of the region where the application is displayed may also be changed based on a user command after the application is displayed on the mirror display 110.

Hereinafter, an example is described with reference to FIGS. 4 and 5 in which the reflectivity of a region on the mirror display 110, where an application is displayed is adjusted, based on the reflectivity corresponding to the application.

Figure 4:
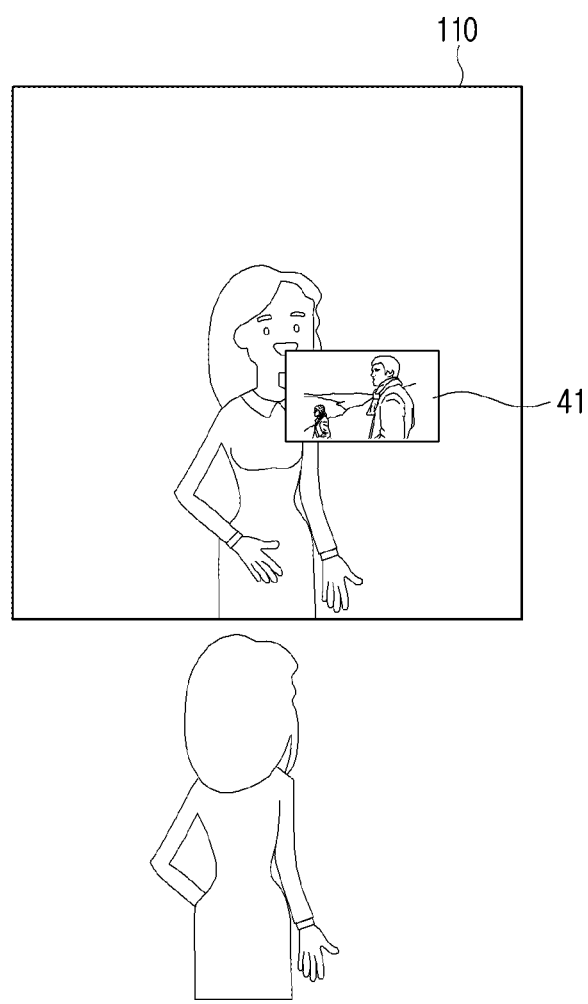
FIGS. 4, 5, 6, 7A, and 7B are views for explaining an example method of displaying an application according to various embodiments.

Referring to FIG. 4, the processor 130 may control the mirror display 110 to perform the mirror function. For example, the processor 130 may control the mirror display 110 so that an entire region of the mirror display 110 has a reflectivity of 100%.

The processor 130 may then execute a video application when receiving a user command for executing the video application, and display a video 41 provided by the video application on a partial region of the mirror display 110.

Here, the processor 130 may control the mirror display 110 so that the region where the video 41 is displayed has a reflectivity of 0%, when 0% is the reflectivity for the video application stored in the memory 120. In this case, the remaining region of the mirror display 110, other than the region where the video 41 is displayed, may still have the reflectivity of 100%.

As such, according to an example embodiment of the disclosure, it is possible to minimize or reduce image quality loss due to external light reflection in that the display apparatus 100 may adjust the region where the video 41 is displayed to have the reflectivity of 0%.

Figure 5:
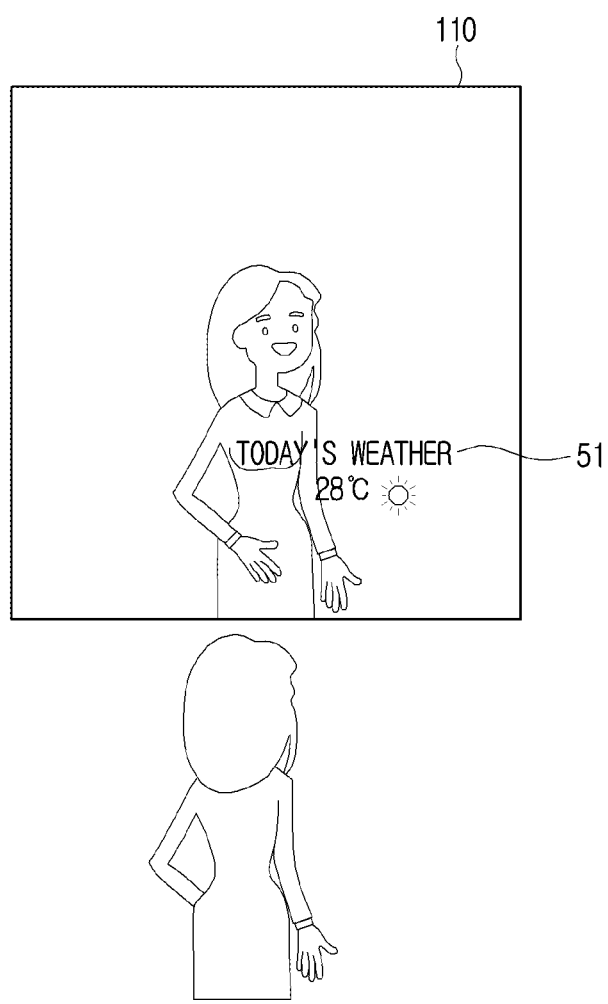

Referring to FIG. 5, the processor 130 may control the mirror display 110 so that the mirror display 110 performs the mirror function. For example, the processor 130 may control the mirror display 110 so that the entire region of the mirror display 110 has the reflectivity of 100%.

The processor 130 may then execute a weather application when receiving a user command for executing the weather application, and display weather information 51 provided by the weather application on a partial region of the mirror display 110.

Here, the processor 130 may control the mirror display 110 so that the region where the weather information 51 is displayed has a reflectivity of 50%, when 50% is the reflectivity for the weather application stored in the memory 120. In this case, the remaining region of the mirror display 110, other than the region where the weather information 51 is displayed, may still have the reflectivity of 100%.

As such, according to an example embodiment of the disclosure, the display apparatus 100 may provide a natural screen in which the weather information 51 and a user appearance reflected in the region where the weather information 51 is displayed are blended, in that the region where the weather information 51 is displayed is adjusted to have the reflectivity of 50%.

Meanwhile, the processor 130 may change a location where the application is displayed based on a user command when receiving a user command for changing the location of the application displayed on the mirror display 110, and adjust the reflectivity of the region to which the application is moved based on the reflectivity for the application.

Figure 6:
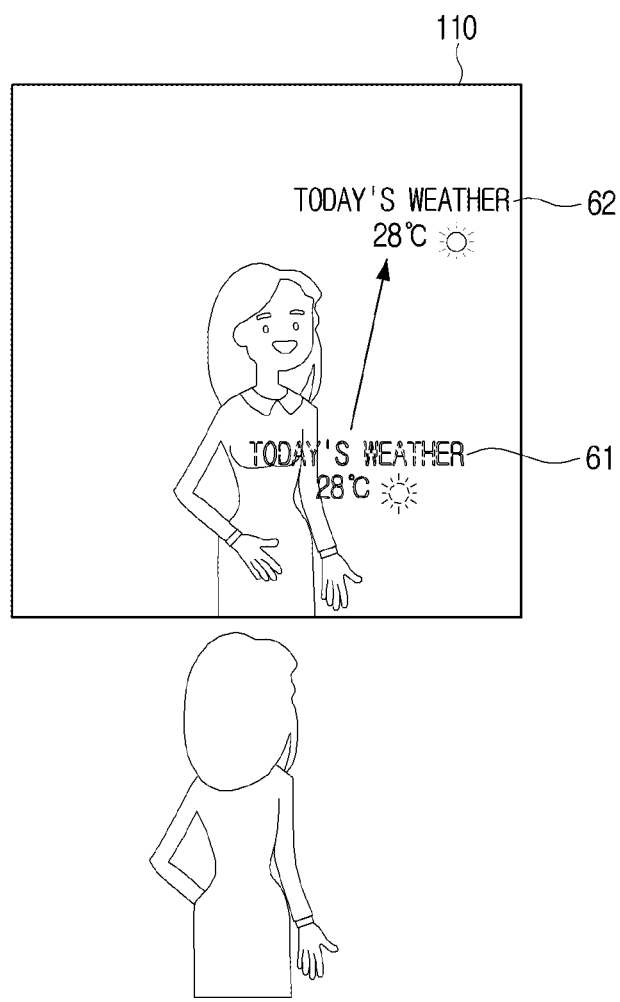

For example, as shown in FIG. 6, the processor 130 may move and display weather information 62 based on a user command when receiving the user command for moving weather information 61 to another region.

In this case, the processor 130 may control the mirror display 110 so that the region where the weather information 62 is moved and displayed has a reflectivity of 50%, when 50% is the reflectivity for the weather application stored in the memory 120. In addition, the processor 130 may control the mirror display 110 so that the region where the weather information 61 was previously displayed has a reflectivity of 100%.

Meanwhile, the processor 130 may change a size of the application based on a user command when receiving a user command for changing the size of the application displayed on the mirror display 110, and adjust reflectivity of the region where the application of the changed size is displayed based on the reflectivity for the application.

Here, changing the size of the application may include enlarging or reducing the application.

Figure 7A:
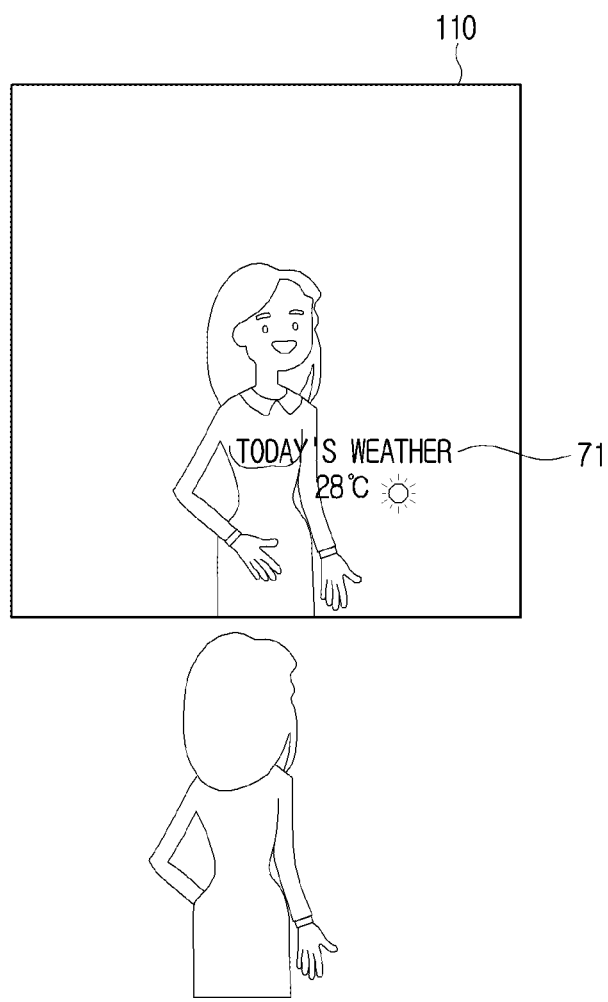
Figure 7B:
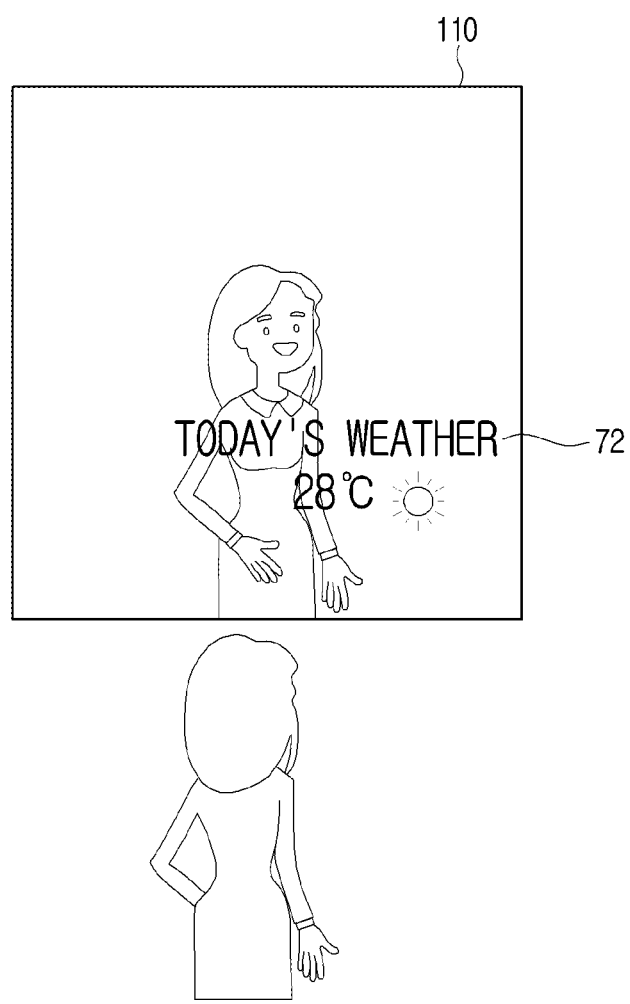

For example, as shown in FIGS. 7A and 7B, the processor 130 may enlarge weather information 71 and display weather information 72 based on a user command when receiving the user command for enlarging a size of the weather information 71.

In this case, the processor 130 may control the mirror display 110 so that a region where the weather information 71 is moved and displayed has a reflectivity of 50%, when 50% is the reflectivity for the weather application stored in the memory 120.

Meanwhile, the processor 130 may change the information on reflectivity of the application based on a user command and store the same in the memory 120.

Figure 8:
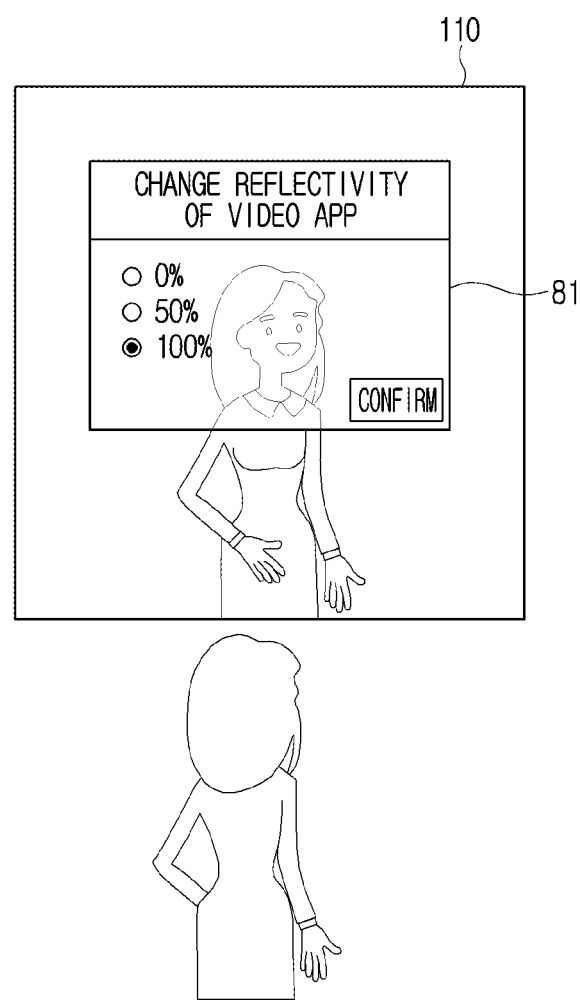
FIG. 8 is a view for explaining an example method for setting reflectivity of an application according to various embodiments.

For example, as shown in FIG. 8, the processor 130 may display a user interface 81 for setting reflectivity of the application on the mirror display 110, change the reflectivity of the corresponding application to the reflectivity input through the user interface 81, and store the same in the memory 120.

In this way, the user may change the reflectivity of the application set for the application for each application, and the information on the changed reflectivity may be stored in the memory 120.

Meanwhile, the above example describes that one application is displayed on the mirror display 110, and this configuration is only an example.

That is, the processor 130 may display a plurality of applications on the mirror display 110. In this case, the processor 130 may adjust the reflectivity of regions on the mirror display 110, where each application is displayed, based on the reflectivity corresponding to each application.

For example, the memory 120 may store information on reflectivity corresponding to a first application and reflectivity corresponding to a second application.

In this case, the processor 130 may display the first and second applications on the mirror display 110, respectively, adjust reflectivity of a (first) region on the mirror display 110, where the first application is displayed, based on the reflectivity corresponding to the first application, and adjust reflectivity of a (second) region on the mirror display 110, where the second application is displayed, based on the reflectivity corresponding to the second application.

In this case, the regions where the respective applications are displayed may have different reflectivities from each other based on the reflectivity corresponding to each application. For example, the reflectivity corresponding to the first application may be different from the reflectivity corresponding to the second application.

Alternatively, the regions where the respective applications are displayed may have the same reflectivities as each other based on the reflectivity corresponding to each application. For example, the reflectivity corresponding to the first application may be the same as the reflectivity corresponding to the second application.

Figure 9:
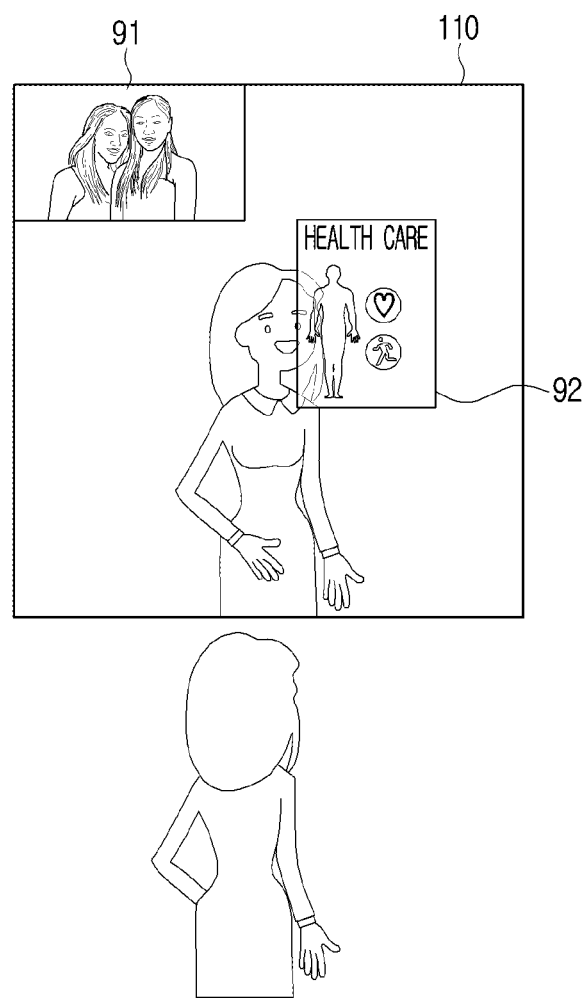
FIGS. 9, 10, 11A, 11B, 12A, 12B, and 13 are views for explaining an example method of displaying an application according to various embodiments.

In detail, referring to FIG. 9, the processor 130 may control the mirror display 110 to perform a mirror function. For example, the processor 130 may control the mirror display 110 so that the entire region of the mirror display 110 has a reflectivity of 100%.

In this case, the processor 130 may execute a photo application when receiving a user command for executing the photo application, and display a photo 91 provided by the photo application on a partial region of the mirror display 110.

Here, the processor 130 may control the mirror display 110 so that the region where the photo 91 is displayed has a reflectivity of 0%, when 0% is the reflectivity for the photo application stored in the memory 120.

The processor 130 may then execute a health care application when receiving a user command for executing the health care application, and display health-related information 92 provided by the health care application on a partial region of the mirror display 110.

Here, the processor 130 may control the mirror display 110 so that the region where the health-related information 92 is displayed has a reflectivity of 50%, when 50% is the reflectivity for the health care application stored in the memory 120.

As such, according to an embodiment of the present disclosure, the processor 130 may adjust the reflectivity of the region on the mirror display 110, where an application is displayed, for each application, based on the reflectivity for each application.

Accordingly, it is possible to provide a natural screen to the user while preventing or reducing lower image quality of the application on the mirror display 110 when the reflectivity is appropriately set in consideration of an application feature for each application.

Meanwhile, the above example describes that the reflectivity of the region where the application is displayed is adjusted based on the reflectivity corresponding to the application, and this configuration is only an example.

That is, according to an embodiment of the disclosure, the display apparatus 100 may also adjust the reflectivity of a region where an application is displayed by further considering the location, size and the like of the region where the application is displayed, which is described below in more detail.

The processor 130 may adjust the reflectivity of a region where an application is displayed based on the reflectivity corresponding to the application and a location of a region where the application is displayed.

In detail, the processor 130 may adjust the reflectivity of a region where an application is displayed based on the reflectivity corresponding to the application when the application is displayed in an edge region of the mirror display 110, and adjust the reflectivity of the region where the application is displayed based on a predetermined reflectivity when the application is displayed in a central region of the mirror display 110, and the reflectivity corresponding to the application is smaller than the predetermined reflectivity.

Here, the central region may, for example, be a region having a predetermined size based on a center of the mirror display 110, and the other regions may, for example, be referred to as the edge region.

That is, when the application is displayed in the central region of the mirror display 110, the processor 130 may adjust the reflectivity of the region where the application is displayed to be higher than the corresponding reflectivity in consideration of a magnitude of the reflectivity set for the application.

Figure 10:
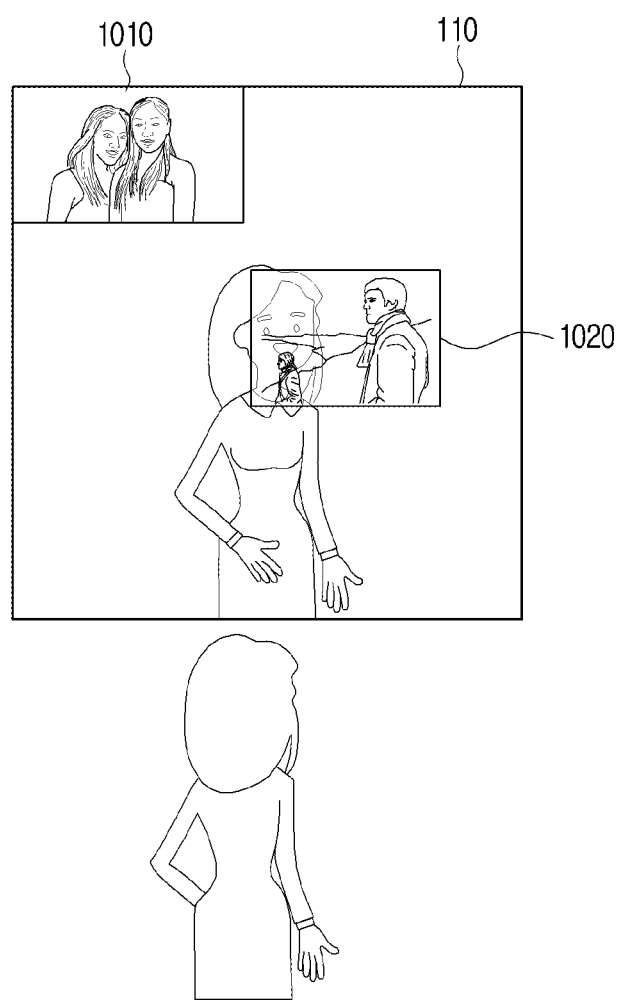

For example, as shown in FIG. 10, it may be assumed that 0% is a reflectivity for each of a photo application and a video application stored in the memory 120, the video application is displayed in the central region of the mirror display 110, and the photo application is displayed in the edge region of the mirror display 110.

In this case, the processor 130 may control the mirror display 110 so that the region where a photo 1010 provided by the photo application is displayed has the reflectivity of 0%.

However, the reflectivity set for the video application may be 0%, which is smaller than the predetermined reflectivity (e.g., 50%). Accordingly, the processor 130 may adjust the region where a video 1020 provided by the video application is displayed to have the predetermined reflectivity of 50% for example, instead of the reflectivity of 0%.

Meanwhile, the processor 130 may adjust the reflectivity of the region where the application is displayed based on the reflectivity corresponding to the application and the size of the region where the application is displayed.

For example, the processor 130 may adjust the reflectivity of the region where the application is displayed based on the reflectivity corresponding to the application when the application is displayed on the mirror display 110 while having a size smaller than a predetermined size, and adjust the reflectivity of the region where the application is displayed based on a predetermined reflectivity when the application is displayed on the mirror display 110 while having a size of the predetermined size or larger, and the reflectivity corresponding to the application is smaller than the predetermined reflectivity.

That is, when the application has a large size (e.g., exceeding a predetermined size threshold), the processor 130 may adjust the reflectivity of the region where the application is displayed to be higher than the corresponding reflectivity in consideration of a magnitude of the reflectivity set for the application.

Figure 11A:
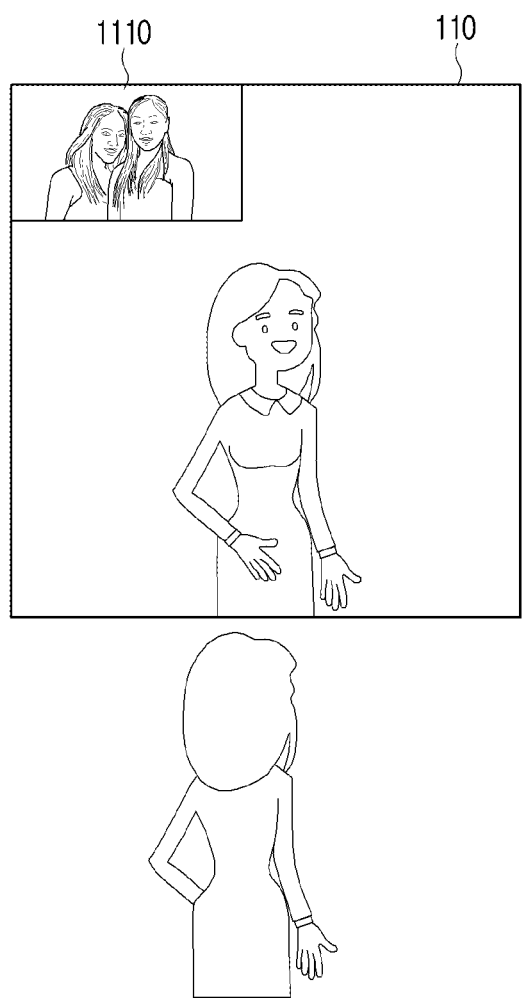

For example, as shown in FIG. 11A, it may be assumed that 0% is the reflectivity for the photo application stored in the memory 120, and the photo application is displayed in a partial region of the mirror display 110 while having a size smaller than a predetermined size.

In this case, the processor 130 may control the mirror display 110 so that the region where a photo 1110 provided by the photo application is displayed has a reflectivity of 0%.

Figure 11B:
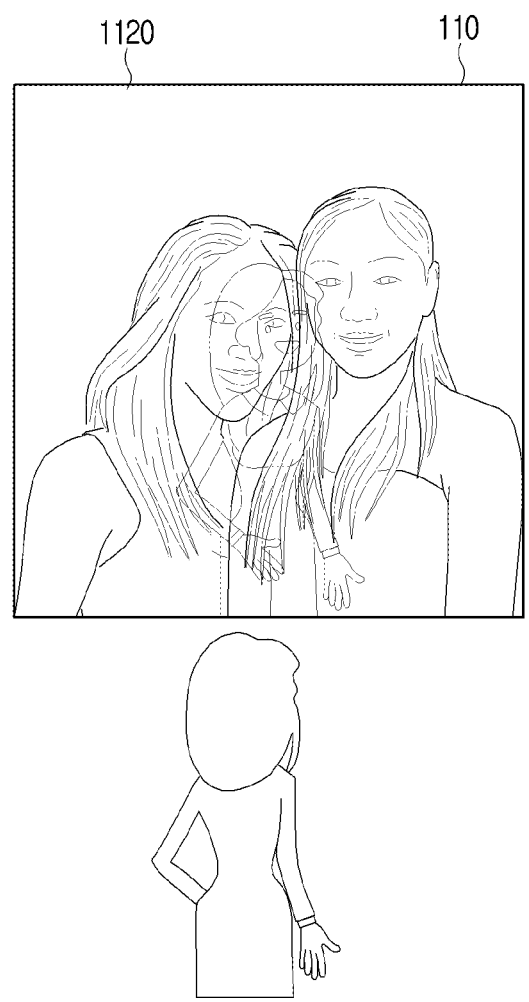

For another example, as shown in FIG. 11B, it may be assumed that the reflectivity of the photo application stored in the memory 120 is 0%, and the photo application is displayed on the full screen on the mirror display 110. Here, the photo application displayed in the full screen may have a size of the predetermined size or larger.

In this case, the reflectivity set for the photo application may be 0%, which is smaller than the predetermined reflectivity (e.g., 50%). Accordingly, the processor 130 may adjust an entire region where a photo 1120 is displayed to have the predetermined reflectivity of 50% for example, instead of the reflectivity of 0%.

As such, according to an example embodiment of the disclosure, it is possible to prevent (or reduce) the user appearance reflected on the mirror display 110 from being blocked based on the location or size of the region where the application is displayed on the mirror display 110.

Meanwhile, the processor 130 may adjust the reflectivity of the region where the application is displayed in consideration of the moved location or the changed size when the location of the application displayed on the mirror display 110 is moved or its size is changed.

First, the processor 130 may display the application in a region when receiving a user command for moving the application to another region of the mirror display 110, and adjust the reflectivity of the region where the application is displayed based on the reflectivity corresponding to the application and the location of the region on the mirror display 110, where the application is moved.

For example, the processor 130 may display the application in a region to which the application is moved based on a user command, when receiving the user command for moving the application displayed in the edge region of the mirror display 110 to the central region.

In this case, the processor 130 may adjust the reflectivity of the region where the application is displayed based on a predetermined reflectivity when the reflectivity corresponding to the application is smaller than the predetermined reflectivity. However, the processor 130 may adjust the reflectivity of the region where the application is displayed based on the reflectivity corresponding to the application when the reflectivity is greater than the reflectivity corresponding to the application.

In addition, the processor 130 may display the application in the region to which the application is moved based on the user command, when receiving the user command for moving the application displayed in the central region of the mirror display 110 to the edge region.

In this case, the processor 130 may adjust the reflectivity of the region where the application is displayed based on the reflectivity corresponding to the application.

Figure 12A:
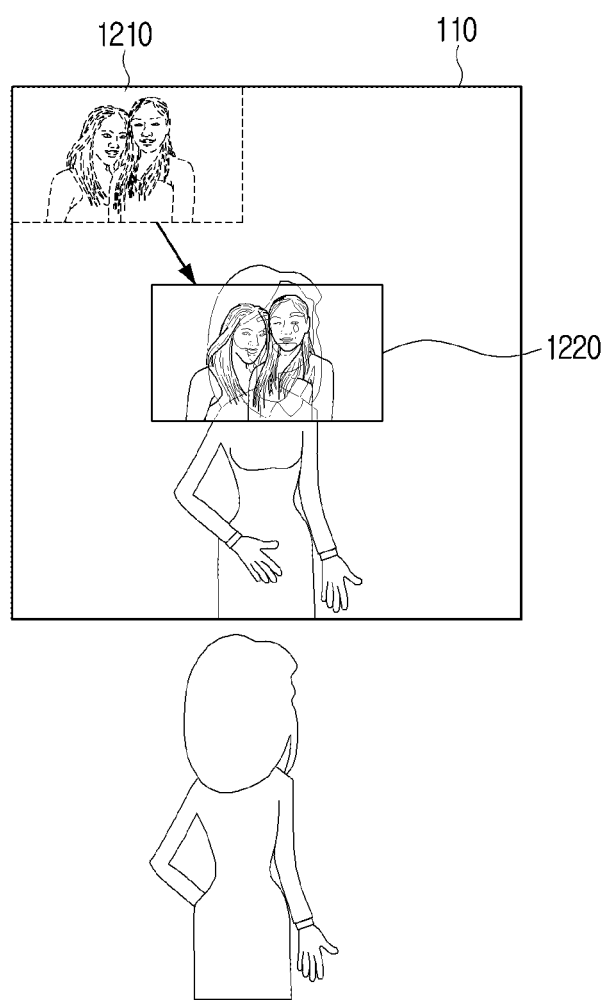

For example, as shown in FIG. 12A, it may be assumed that a video 1210 provided by the video application is displayed in the edge region of the mirror display 110 and the region where the video 1210 is displayed has a reflectivity of 0%.

In this case, the processor 130 may move and display a video 1220 based on a user command when receiving the user command for moving a video 1210.

Here, the processor 130 may compare reflectivity corresponding to the video application with a predetermined reflectivity when the region to which the video 1220 is moved is included in the central region.

In this case, the reflectivity set for the video application may be 0%, which is smaller than the predetermined reflectivity (e.g., 50%). Accordingly, the processor 130 may adjust the region where the video 1220 is displayed to have a predetermined reflectivity of 50% for example, instead of the reflectivity of 0%. In addition, the processor 130 may control the mirror display 110 so that the region where the video 1210 was previously displayed has a reflectivity of 100%.

Figure 12B:
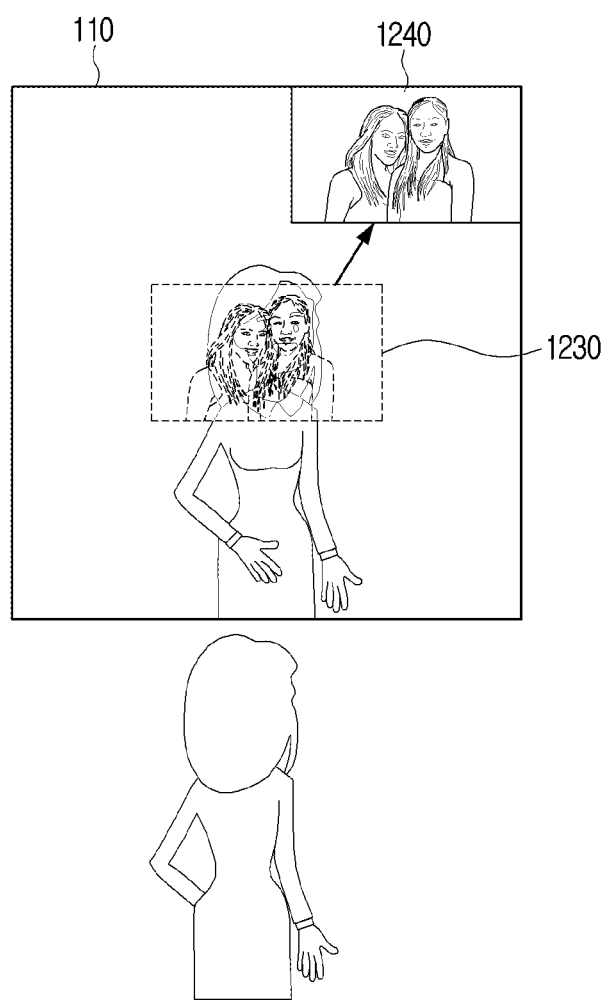

In addition, as shown in FIG. 12B, the processor 130 may move and display a video 1240 based on a user command, when receiving the user command for moving a video 1230.

Here, the processor 130 may adjust the region where the video 1240 is displayed to have a reflectivity of 0% when the region to which the video 1240 is moved is included in the edge region. In addition, the processor 130 may control the mirror display 110 so that the region where the video 1230 was previously displayed has a reflectivity of 100%.

Meanwhile, the processor 130 may change and display the size of the application when receiving a user command for changing the size of the region where the application is displayed, and adjust the reflectivity of the region where the application is displayed based on the reflectivity corresponding to the application and the changed size of the application.

For example, the processor 130 may change the size of the application based on the user command and display the same, when receiving the user command for changing the application displayed while having a size smaller than a predetermined size to have a size of the predetermined size or larger.

In this case, the processor 130 may adjust the reflectivity of the region where the application is displayed based on a predetermined reflectivity when the reflectivity corresponding to the application is smaller than the predetermined reflectivity. However, the processor 130 may adjust the reflectivity of the region where the application is displayed based on the reflectivity corresponding to the application when the reflectivity corresponding to the application is greater than the predetermined reflectivity.

In addition, the processor 130 may change the size of the application based on the user command and display the same, when receiving the user command for changing the application displayed while having a size of a predetermined size or larger to have a size smaller than the predetermined size.

In this case, the processor 130 may adjust the reflectivity of the region where the application is displayed based on the reflectivity corresponding to the application.

Figure 13:
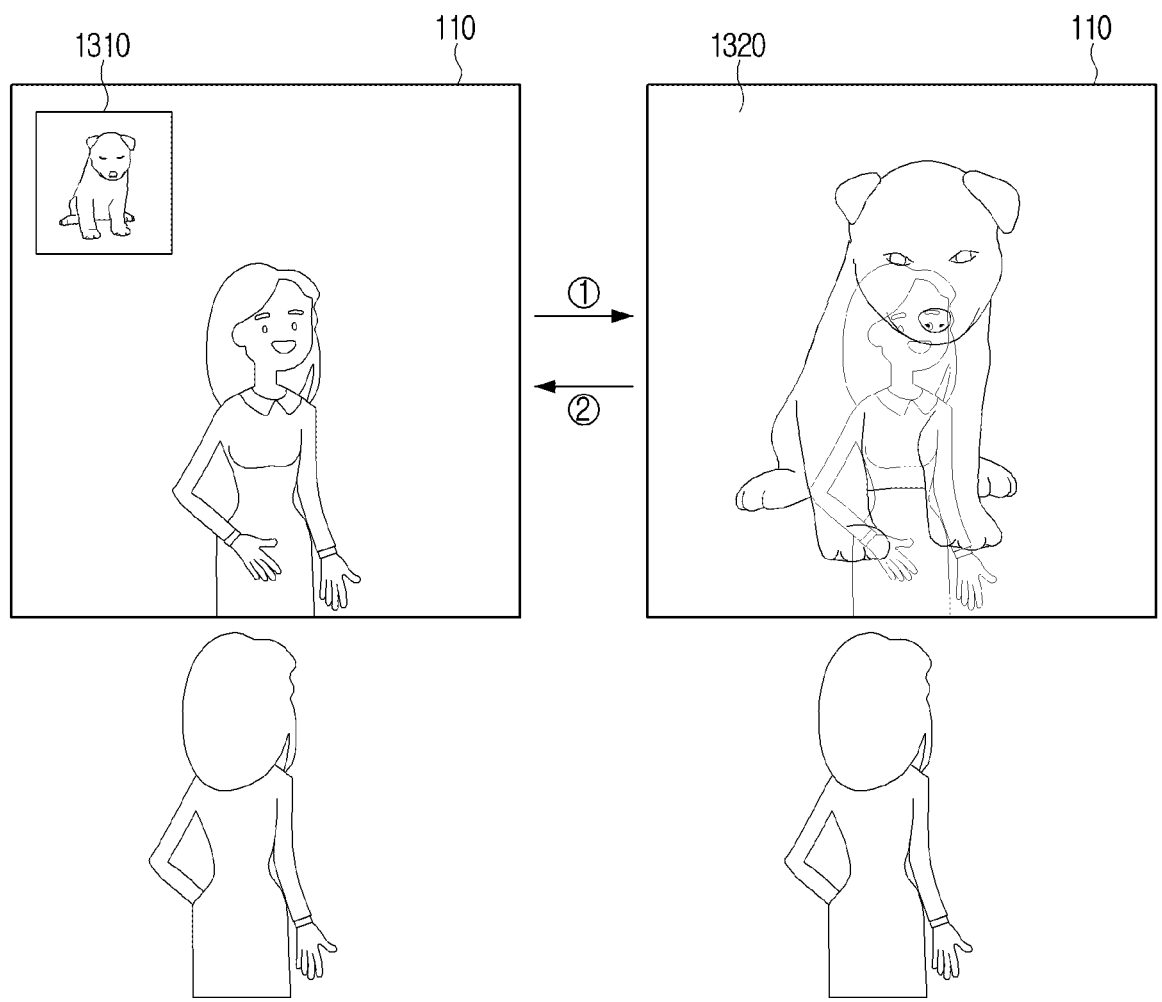

For example, as shown in ① of FIG. 13, it may be assumed that a photo 1310 provided by a photo application is displayed on the mirror display 110 while having a size smaller than a predetermined size, and a region where the photo 1310 is displayed has a reflectivity of 0%.

In this case, the processor 130 may display a photo 1320 in full screen based on a user command, when the user command for displaying the photo 1310 in full screen is received.

Here, the reflectivity set for the photo application may be 0%, which is less than a predetermined reflectivity (e.g., 50%). Accordingly, the processor 130 may adjust an entire region where the photo 1320 is displayed to have the predetermined reflectivity of 50% for example, instead of the reflectivity of 0%.

In addition, as shown in ② of FIG. 13, the processor 130 may adjust the photo 1310 to have a smaller size based on a user command and display the same, when receiving a user command for changing the picture 1320 displayed in the full screen to have a size smaller than the predetermined size.

In this case, the processor 130 may adjust the region where the photo 1310 is displayed to have a reflectivity of 0%.

Meanwhile, in the above embodiment, when the size of the application is changed, the processor 130 may adjust the reflectivity of the region where the application is displayed based on whether the application whose size is changed is displayed in the central region or edge region of the display 110.

A detailed description related thereto is not repeated here in that the description above already describes an example method of determining reflectivity of a region where the application is displayed based on whether the region where the application is displayed is a central region or an edge region of the mirror display 110.

Meanwhile, as described above, the reflectivity of the mirror display 110 may be adjusted for each region.

Here, the region where an application is displayed on the mirror display 110 may not match with at least one region among the plurality of regions of the mirror display 110. In this case, the application may be unnaturally displayed when a region where a part of the application is displayed and a region where the remaining part of the application is displayed among the plurality of regions are driven to have reflectivities different from each other.

Accordingly, it is necessary to match the region where the application is displayed with at least one region among the plurality of regions of the display 110 when the mirror display 110 has an adjusted reflectivity for each region, which is described below in more detail.

First, the processor 130 may determine the region where the application is displayed among the plurality of regions based on the location and size of the application to be displayed when receiving a user command for displaying the application.

Here, the location and size of the application to be displayed may be set as defaults.

That is, the application may be set to be displayed while having a default size in a default location. For example, the application may be set to be displayed in a full screen of the mirror display 110, or displayed in a partial region of the mirror display 110 while having a specific size in a specific location.

In this case, the processor 130 may determine whether a display region of the application, determined based on the location and size of the application to be displayed, matches with at least one region among the plurality of regions, thereby determining the region where the application is displayed among the plurality of regions.

In addition, the processor 130 may determine whether the display region of the application matches with at least one region among the plurality of regions, thereby determining the region corresponding to the display region among the plurality of regions.

Here, "matching" may, for example, indicate that the location and size of the display region for the application match with the location and size of a region among the plurality of regions, including one region or at least two regions, and that the display region exactly overlaps with the corresponding region.

Figure 14:
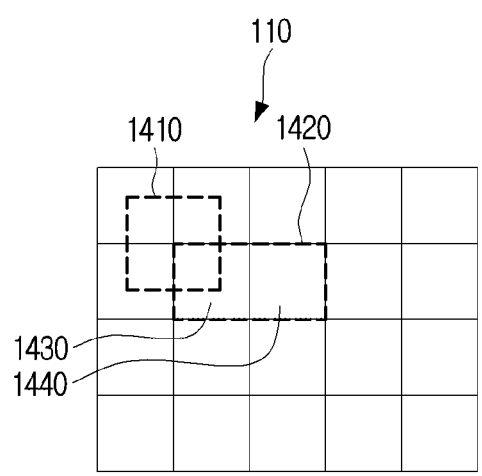
FIG. 14 is a view for explaining a matching relationship between a display region and a plurality of regions of an application according to various embodiments.

For example, in a case of FIG. 14, a display region 1410 of the application does not match with at least one region among the plurality of regions of the mirror display 110. For another example, it may be seen that a display region 1420 of the application matches with a region including two regions 1430 and 1440 among the plurality of regions.

Accordingly, the processor 130 may determine whether the display region of the application matches with at least one region among the plurality of regions.

Meanwhile, the processor 130 may determine the matched region as a region where the application is displayed when determining that the display region of the application matches with at least one region among the plurality of regions.

In the above example shown in FIG. 14, the processor 130 may determine the region including the two regions 1430 and 1440 as the region where the application is displayed in that the display region 1420 of the application matches with the region including the two regions 1430 and 1440 among the plurality of regions.

However, the processor 130 may change at least one of the location and size of the display region of the application for the display region of the application to match with at least one region among the plurality of regions, when determining that the display region of the application does not match with at least one region among the plurality of regions, and determine the changed display region as the region where the application is displayed.

That is, the processor 130 may enlarge or reduce the size of the display region of the application, or move the location of the display region of the application up/down/left/right, so that the display region of the application matches with at least one region among the plurality of regions, and the display region of the application matches with at least one region among the plurality of regions.

For example, the processor 130 may move the display region of the application in at least one of the up, down, left, and right directions to match the display region of the application with at least one region among the plurality of regions when the size of the display region of the application is the same as the size of at least one region among the plurality of regions, and the location of the display region of the application does not match with the location of at least one region among the plurality of regions.

For still another example, the processor 130 may match the display region of the application with at least one region among the plurality of regions by reducing the size of the display region of the application when the size of the display region of the application is larger than the size of at least one region among the plurality of regions, and enlarging the size of the display region of the application when the size of the display region of the application is smaller than the size of at least one region among the plurality of regions. Here, in some cases, the processor 130 may move the display region of the application whose size is enlarged or reduced in at least one of the up, down, left, and right directions to match the display region of the application with at least one region among the plurality of regions.

Meanwhile, the processor 130 may match the display region of the application with at least one region among the plurality of regions by changing at least one of the location and size of the display region of the application to minimize (or reduce) a degree of change in the location and size of the display region of the application.

That is, the processor 130 may change at least one of the location and size of the display region of the application to minimize a difference from the location and size before the change.

Figures 15A, 15B:
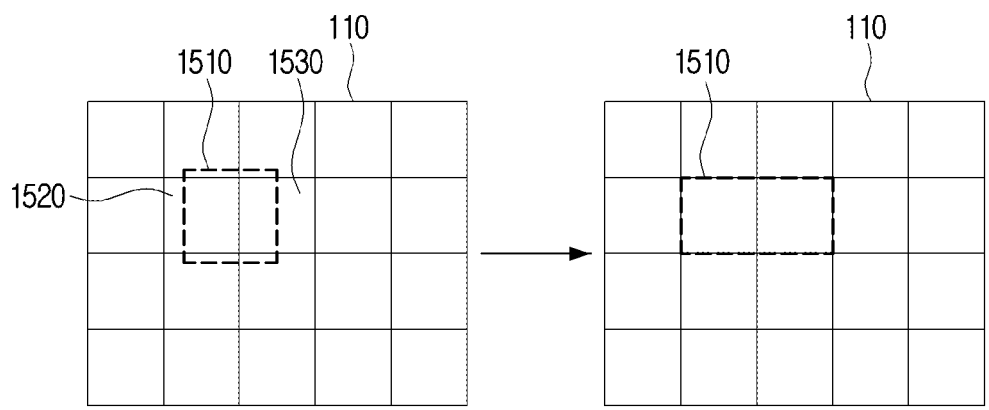
FIGS. 15A and 15B is a view for explaining an example method of performing a match of a display region of an application according to various embodiments.

For example, as shown in FIG. 15A, a display region 1510 of the application may not match with at least one region among the plurality of regions.

Here, the display region 1510 of the application may have a minimum degree of change in location and size (or a degree of change less than some predetermined degree of change) compared to those before the change when the location and size of the display region 1510 of the application are changed for the region to match with a region including two regions 1520 and 1530 among the plurality of regions.

Accordingly, as shown in of FIG. 15B, the processor 130 may change the location and size of the display region 1510 of the application for the region to match with the region including the two regions 1520 and 1530 among the plurality of regions.

In addition, the processor 130 may match the display region of the application with at least one region among the plurality of regions by changing at least one of the location and size of the display region of the application for the region not to overlap a region on the mirror display 110, where another application is displayed.

Figures 16A, 16B:
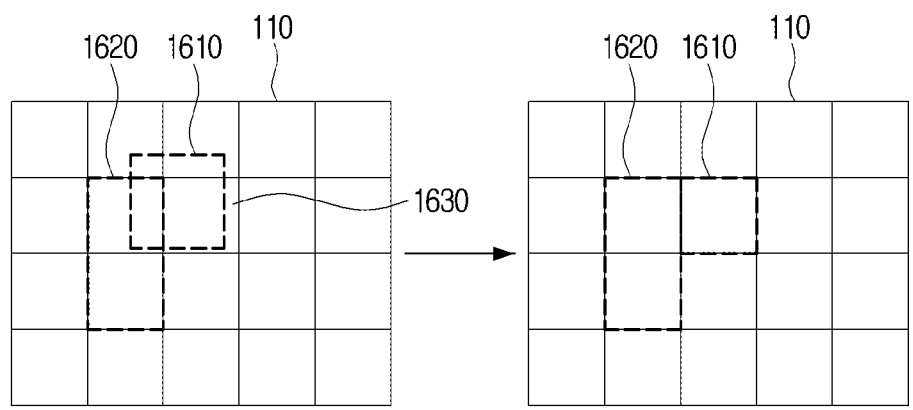
FIGS. 16A and 16B are views for explaining a method of performing a match of the display region of an application according to various embodiments.

For example, as shown in FIG. 16A, it may be assumed that a display region 1610 of the application that does not match with at least one region among the plurality of regions partially overlaps a region 1620 where another application is displayed.

In this case, as shown in FIG. 16B, the processor 130 may change the location of the display region 1610 for the display region 1610 match with the region 1630 among the plurality of regions without overlapping the region 1620 where another application is displayed.

Meanwhile, the processor 130 may change at least one of the location and size of the display region of the application to have the minimum degree of change (or a degree of change less than some predetermined degree of change) when changing at least one of the location and size of the display region of the application for the region to match with at least one region among the plurality of regions without overlapping the region of the mirror display 110, where another application is displayed.

As a result, the processor 130 may determine the region where the application is displayed among the plurality of regions using this method.

The processor 130 may then control the mirror display 110 to display the application in the determined region. That is, the processor 130 may display a screen including a video or image provided by the application in the determined region.

In addition, the processor 130 may control the mirror display 110 for the determined region to have the reflectivity corresponding to the application.

For example, the processor 130 may determine the reflectivity corresponding to the application based on the information on the reflectivity corresponding to the application, stored in the memory 120, and drive the mirror display 110 for the region where the application is displayed to have determined reflectivity.

Figure 17:
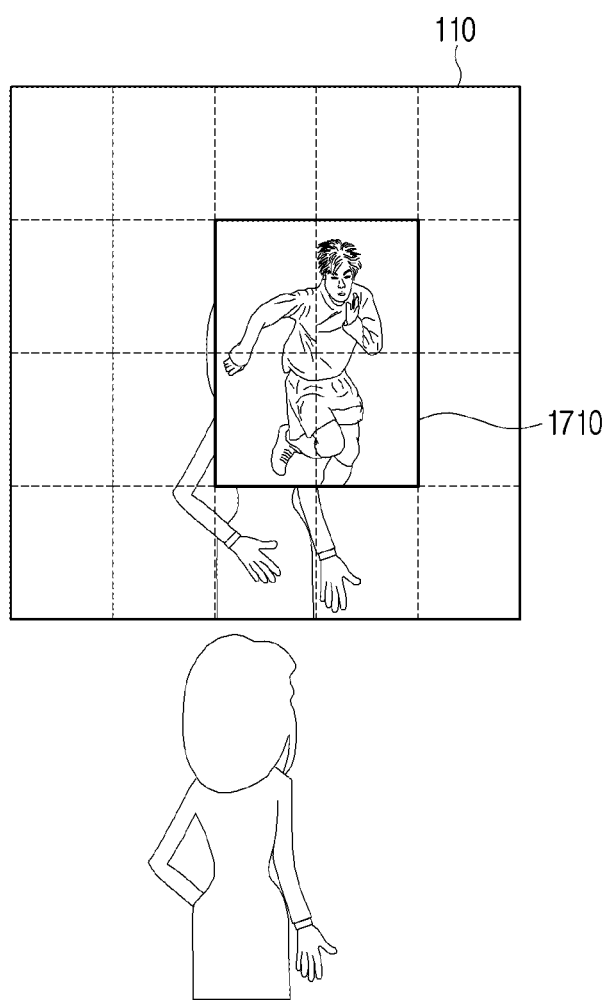
FIG. 17 is a view for explaining an example method of displaying an application according to various embodiments.

Referring to FIG. 17, the processor 130 may control the mirror display 110 for a plurality of regions to perform a mirror function. For example, the processor 130 may control the mirror display 110 for a plurality of regions of the mirror display 110 to have a reflectivity of 100%.

The processor 130 may then execute a video application, when receiving a user command for executing the video application, determine a region 1710 where the video application is displayed among the plurality of regions, and display a video provided by the video application in the determined region 1710.

Here, the processor 130 may control the mirror display 110 so that the region 1710 where the video is displayed has a reflectivity of 0%, when 0% is the reflectivity for the video application stored in the memory 120. In this case, the remaining region of the mirror display 110, other than the region 1710 where the video is displayed, may still have the reflectivity of 100%.

Meanwhile, the above example describes that one application is displayed on the mirror display 110. This configuration is only an example, and the processor 130 may also display a plurality of applications on the mirror display 110.

In this case, the processor 130 may determine a region where each application is displayed among the plurality of regions of the mirror display 110, and display each application in each determined region. In addition, the processor 130 may control the mirror display 110 for the determined region to have the reflectivity corresponding to each application.

Meanwhile, the processor 130 may determine the changed region where the application is displayed among the plurality of regions based on at least one of the changed location and size of the application based on a user command, when receiving the user command for changing at least one of the location and size of the application displayed on the mirror display 110.

Here, a user command may include a user command for moving the application displayed on the mirror display 110 to another region, or a user command for enlarging or reducing the size of the application displayed on the mirror display 110.

Accordingly, the display region of an application on the mirror display 110 may be moved to another region of the mirror display 110 or its size may be changed.

In this case, the processor 130 may determine whether the display region of the application, changed based on the user command, matches with at least one region among the plurality of regions, thereby determining the region where the application is displayed among the plurality of regions.

Figure 18:
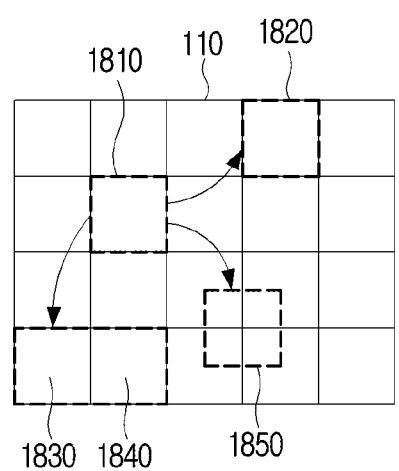
FIG. 18 is a view for explaining a matching relationship between a display region of an application, changed based on a user command, and a plurality of regions according to various embodiments.

For example, as shown in FIG. 18, it may be assumed that the application is displayed in a region 1810 among the plurality of regions.

For example, the processor 130 may determine that the display region of the application, changed based on a user command, matches with a region 1820 among the plurality of regions when the display region 1810 of the application is moved to the region 1820 among the plurality of regions based on the user command.

For another example, the processor 130 may determine that the display region of the application, changed based on a user command, matches with a region including two regions 1830 and 1840 among the plurality of regions when a size of the display region 1810 of the application is changed, and the corresponding region is moved to the region including the regions 1830 and 1840 among the plurality of regions, based on the user command.

For another example, a changed display region 1850 of the application may not match with a region including at least one or at least two regions among the plurality of regions when the display region 1810 of the application is moved to the region 1850 based on a user command. In this case, the processor 130 may determine that the display region of the application, changed based on the user command, does not match with at least one region among the plurality of regions.

Accordingly, the processor 130 may determine whether the display region of the application, changed based on the user command, matches with at least one region among the plurality of regions.

Meanwhile, the processor 130 may determine the matched region as the region where the application is displayed when determining that the changed display region of the application matches with at least one region among the plurality of regions.

In the above example shown in FIG. 18, the processor 130 may determine the region 1820 or the region including the two regions 1830 and 1840 as the region where the application is displayed in that the display region of the application, changed based on the user command, matches with the region 1820 or the region including the two regions 1830 and 1840 among the plurality of regions.

However, when determining that the changed display region of the application does not match with at least one region among the plurality of regions, the processor 130 may change at least one of the location and size of the changed display region of the application for the changed display region of the application to match with at least one region among the plurality of regions, and determine that region as the region where the changed application is displayed.

That is, the processor 130 may enlarge or reduce the size of the changed display region of the application or move the location of the changed display region of the application in the up/down/left/right direction for the changed display region of the application to match with at least one region among the plurality of regions.

For example, the processor 130 may move the display region of the application in at least one of the up, down, left, and right directions to match the display region of the application with at least one region among the plurality of regions when the size of the changed display region of the application is the same as the size of at least one region among the plurality of regions, and the location of the display region of the application does not match with the location of at least one region among the plurality of regions.

For still another example, the processor 130 may match the changed display region of the application with at least one region among the plurality of regions by reducing the size of the display region of the application when the size of the display region of the application is larger than the size of at least one region among the plurality of regions, and by enlarging the size of the display region of the application when the size of the display region of the application is smaller than the size of at least one region among the plurality of regions. Here, in some cases, the processor 130 may move the display region of the application whose size is enlarged or reduced in at least one of the up, down, left, and right directions to match the display region of the application with at least one region among the plurality of regions.

Meanwhile, the processor 130 may match the display region of the application with at least one region among the plurality of regions by changing at least one of the location and size of the display region of the application to minimize a degree of change (or reduce the degree of change to be less than a predetermined degree of change) in the location and size of the changed display region of the application.

That is, the processor 130 may change at least one of the location and size of the display region of the application to minimize (or reduce) a difference from the location and size before the change.

Figures 19A, 19B:
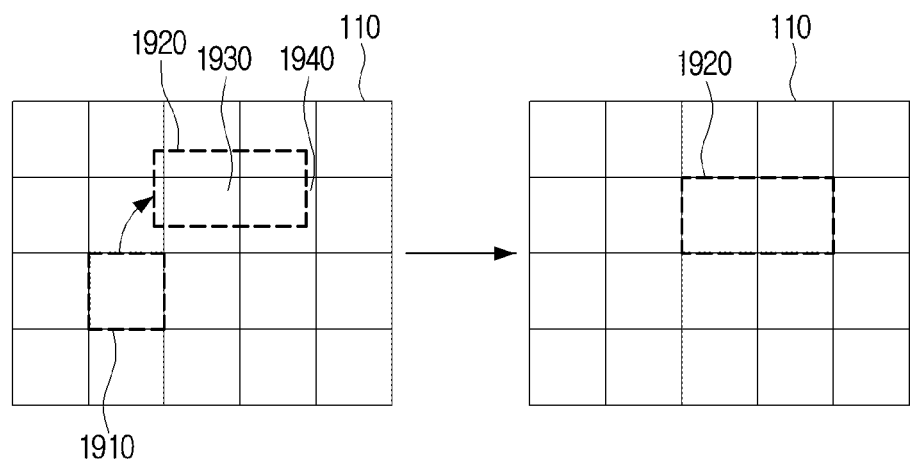
FIGS. 19A and 19B are views for explaining an example method of performing a match of a display region of an application, changed based on a user command, according to various embodiments.

For example, as shown in FIG. 19A, it may be assumed that the application displayed in a region 1910 among the plurality of regions is moved and has an adjusted size based on a user command, and the display region of the application is changed to a region 1920.

In this case, the processor 130 may allow the display region 1920 of the application to have a minimum degree of change (or a degree of change less than a predetermine degree of change) in the location and size compared to those before the change when the location and size of the display region 1920 of the application are changed for the region to match with a region including two regions 1930 and 1940 among the plurality of regions.

Accordingly, as shown in of FIG. 19B, the processor 130 may change the location and size of the display region 1920 of the application for the region to match with the region including the two regions 1930 and 1940 among the plurality of regions.

In addition, the processor 130 may match the display region of the application with at least one region among the plurality of regions by changing at least one of the location and size of the changed display region of the application for the region not to overlap the region on the mirror display 110, where another application is displayed.

Figures 20A, 20B:
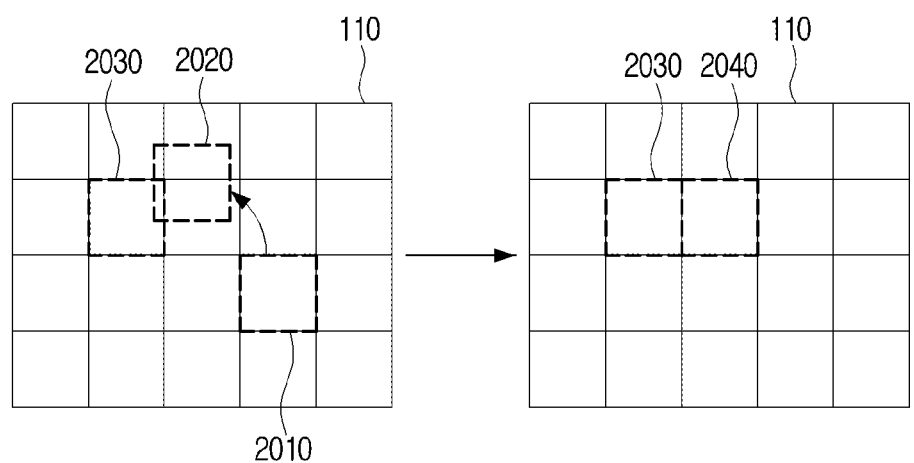
FIGS. 20A and 20B are views for explaining an example method of performing a match of a display region of an application, changed based on a user command, according to various embodiments.

For example, as shown in of FIG. 20A, it may be assumed that the application displayed in a region 2010 among the plurality of regions is moved based on a user command, and the display region of the application is changed to a region 2020.

In this case, the changed display region 2020 of the application may partially overlap a region 2030 on the mirror display 110, where another application is displayed.

In this case, as shown in FIG. 20B, the processor 130 may change the location of the display region of the application for the region to match with a region 2040 among the plurality of regions without overlapping the region 2030 where another application is displayed.

Meanwhile, the processor 130 may change at least one of the location and size of the display region of the application to have the minimum degree of change (or a degree of change less than a predetermined degree of change) when changing at least one of the location and size of the changed display region of the application for the region to match with at least one region among the plurality of regions without overlapping the region on the mirror display 110, where another application is displayed.

As a result, the processor 130 may determine the region where the application whose size or location is changed based on a user command, is displayed among the plurality of regions, using this method.

The processor 130 may then control the mirror display 110 to display the application in the determined region.

In addition, the processor 130 may control the mirror display 110 for the determined region to have the reflectivity corresponding to the application.

In detail, the processor 130 may drive the mirror display 110 for the region where the application whose size or location is changed based on a user command is displayed to have the reflectivity set for the application.

Figure 21:
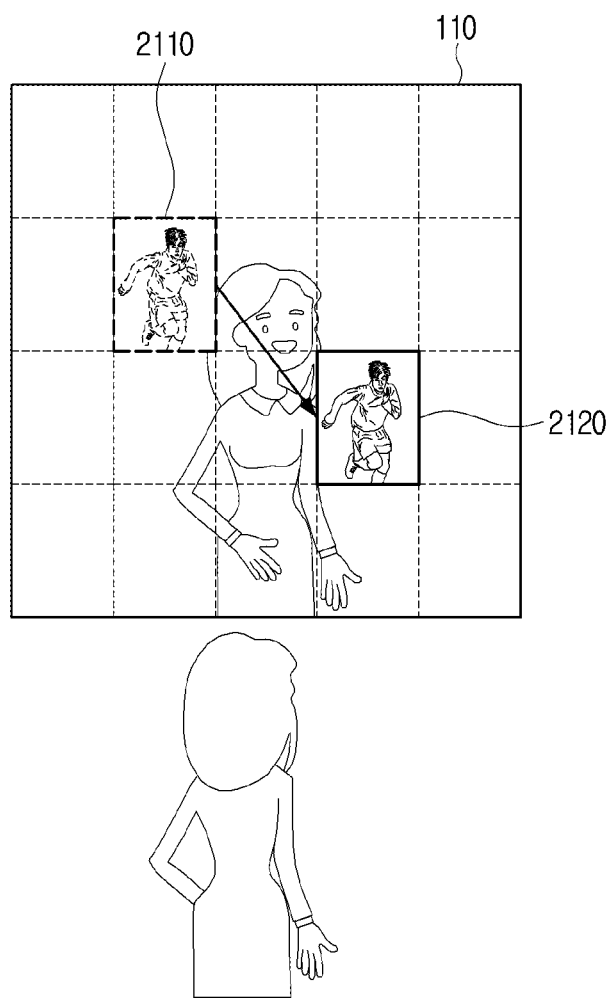
FIGS. 21, 22A, and 22B are views for explaining an example method of displaying an application according to various embodiments.

For example, as shown in FIG. 21, the processor 130 may display a video provided by a video application in the region 2110 among a plurality of regions. Here, the processor 130 may control the mirror display 110 so that the region 2110 has the reflectivity of 0%, when 0% is the reflectivity for the video application stored in the memory 120.

In addition, the processor 130 may determine a region 2120 where the video application moved by a user command is displayed among the plurality of regions when receiving the user command for moving the video to another region, and display the video provided by the video application in the determined region 2120. In this case, the processor 130 may control the mirror display 110 so that the region 2120 where the video is displayed has the reflectivity of 0%.

Figure 22A:
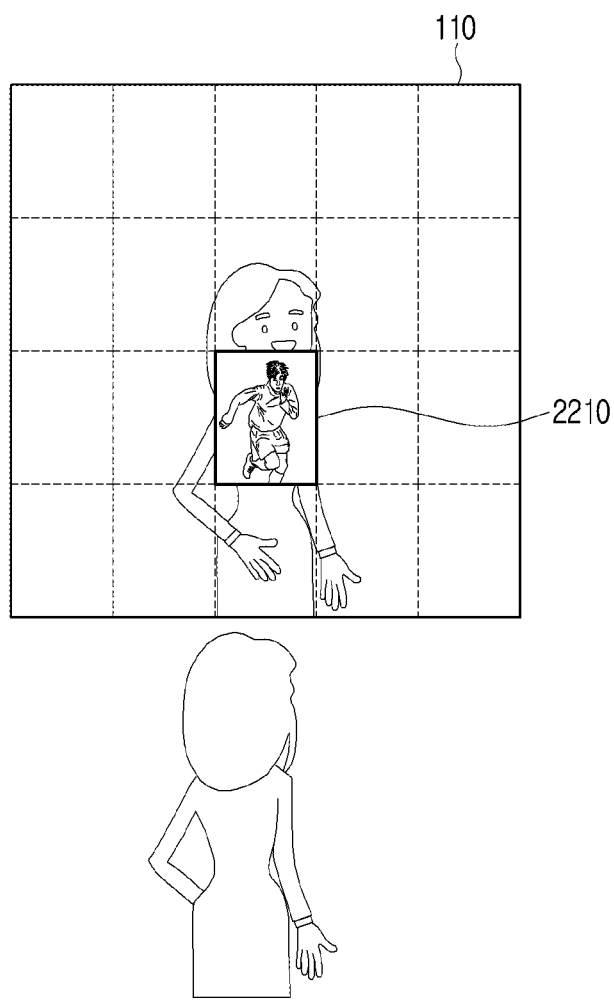
Figure 22B:
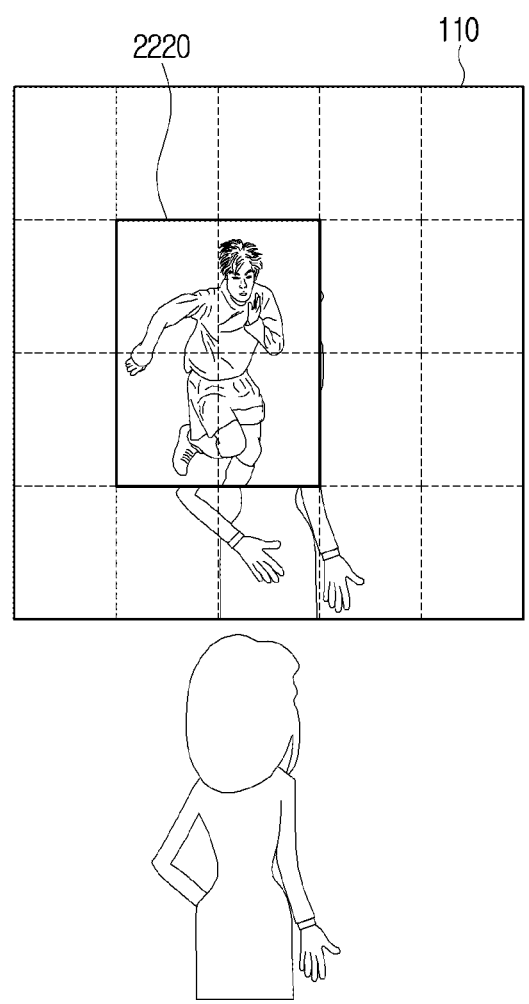

For another example, as shown in FIG. 22A, the processor 130 may display a video provided by the video application in a region 2210 among the plurality of regions. Here, the processor 130 may control the mirror display 110 so that the region 2210 has the reflectivity of 0%, when 0% is the reflectivity for the video application stored in the memory 120.

In addition, the processor 130 may determine a region 2220 where the video application enlarged based on a user command is displayed among the plurality of regions when receiving the user command for enlarging a size of the video, and display the video provided by the video application in the determined region 2220. In this case, the processor 130 may control the mirror display 110 so that the region 2220 where the video is displayed has the reflectivity of 0%.

Figure 23:
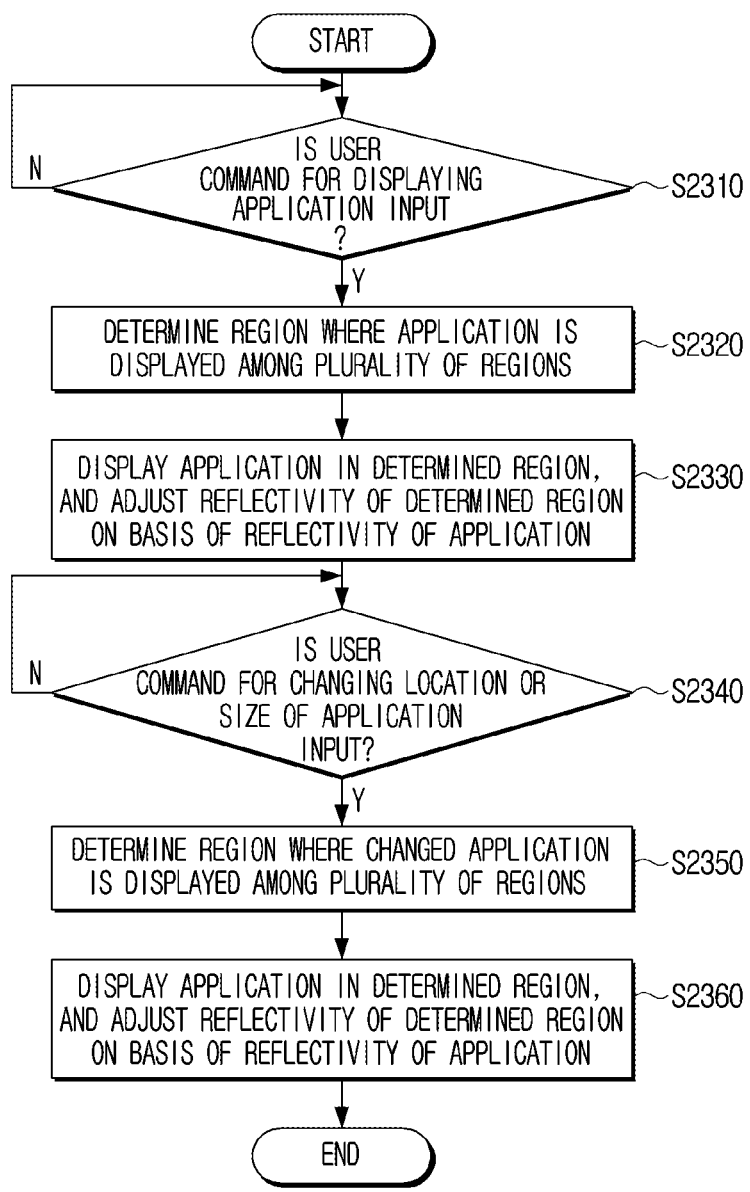
FIG. 23 is a flowchart for explaining an example method for controlling an example display apparatus according to various embodiments.

FIG. 23 is a flowchart for an example method for controlling a display apparatus according to various embodiments.

First, when receiving a user command for displaying an application (S2310—Y), a processor 130 may determine a region where the application is displayed among the plurality of regions on a mirror display 110 (S2320).

The processor 130 may then display the application in the determined region, and adjust reflectivity of the determined region based on reflectivity of the application (S2330).

Meanwhile, when receiving a user command for changing the location or size of the application while the application is displayed on the mirror display 110 (S2340—Y), the processor 130 may determine a region where the application whose size or location is changed is displayed among the plurality of regions on the mirror display 110 (S2350).

The processor 130 may then display the application in the determined region, and adjust the reflectivity of the determined region based on reflectivity of the application (S2360).

Figure 24:
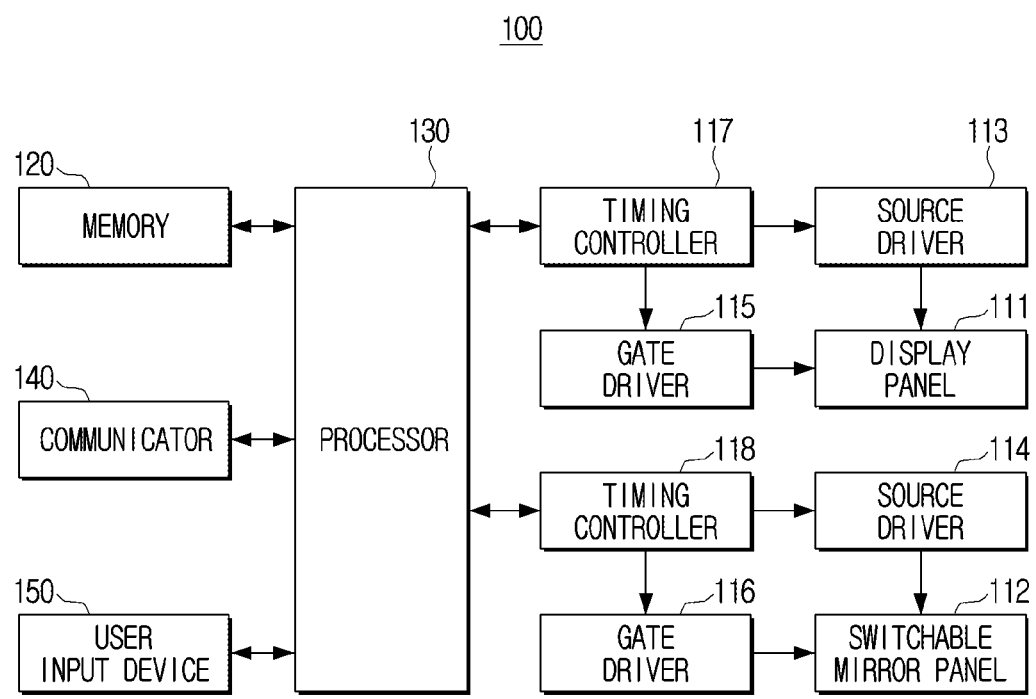
FIG. 24 is a block diagram illustrating a configuration of an example display apparatus according to various embodiments.

FIG. 24 is a block diagram illustrating a configuration of an example display apparatus according to various embodiments.

Referring to FIG. 24, the display apparatus 100 may include a display panel 111, a switchable mirror panel 112, source drivers 113 and 114, gate drivers 115 and 116, timing controllers 117 and 118, memory 120, processor 130, a communicator 140 (e.g., including communication circuitry), and a user input device 150. Here, these components may be controlled by the processor 130.

Meanwhile, the components shown in FIG. 24 are only examples, and at least some components may be omitted or other components may be added in various embodiments.

In addition, the mirror display 110, the memory 120, and the processor 130 are already described with reference to FIGS. 1 through 23, and detailed descriptions of overlapping contents are thus not repeated.

The communicator 140 (e.g., including communication circuitry) is configured to communicate with an external device. In detail, the communicator 140 may communicate with a server (not shown) or the like through a network.

To this end, the communicator 140 may include various modules for accessing the network, such as a network card.

In addition, the communicator 140 may access the network using a wireless-fidelity (Wi-Fi) communication module for performing Wi-Fi communication, and also access the network using a mobile communication module for performing mobile communication through various mobile communication methods such as 3rd generation (3G), long term evolution (LTE), 5th generation (5G) and the like.

In this case, the processor 130 may access the server (not shown) through the communicator 140 to thus download an application and metadata for the application.

The user input device 150 (e.g., including user input device circuitry) is configured to receive the user command.

For example, the user input device 150 may include a touch screen panel. In this case, the touch screen panel may receive a user touch manipulation input in various methods such as a resistive type, a capacitive type, and an infrared (IR) type.

In this case, the touch screen panel 150 may be coupled with the mirror display 110.

Accordingly, the processor 130 may receive various touch manipulations for the mirror display 110.

For example, the processor 130 may receive a user command for displaying an application, a user command for adjusting at least one of the location and/or size of the application, a user command for a user interface, or the like through the touch manipulation.

Meanwhile, the mirror display 110 may include the display panel 111 and the switchable mirror panel 112.

Figure 25:
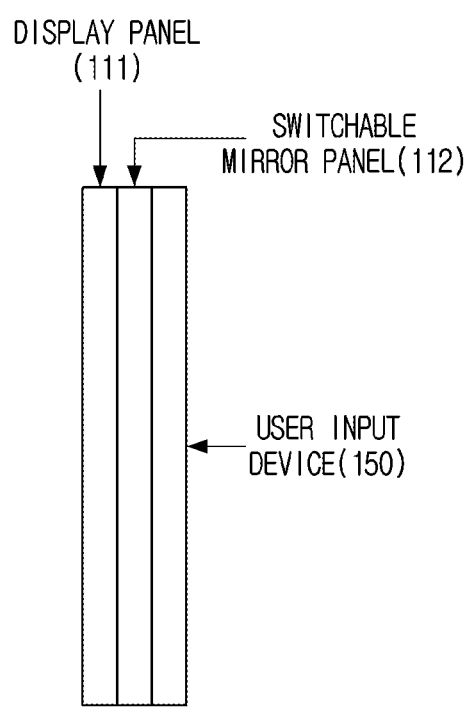
FIG. 25 illustrates an example structure of a mirror display according to various embodiments.

For example, as shown in FIG. 25, the switchable mirror panel 112 may be positioned on the display panel 111, and the touch screen panel 150 may be positioned on the switchable mirror panel 112.

In addition, in various embodiments, the mirror display 110 may further include a backlight (not shown) when a backlight (not shown) is required to drive pixels of the display panel 111.

The display panel 111 may include a plurality of pixels arranged in a matrix type, and may display various images and videos through light emitted from the pixels. Here, the display panel 111 may be implemented as various types of displays such as a liquid crystal display (LCD), a light-emitting diode (LED), an organic light emitting diode (OLED), or the like.

In this case, the timing controller 117 may control the source driver 113 and the gate driver 115 to display the application (that is, a video, a screen, or the like, provided by the application) through the display panel 111.

For example, the timing controller 117 may control the source driver 113 and the gate driver 115 to apply a voltage to pixels in a region where the application is displayed among the plurality of pixels arranged in a matrix type, and the application may thus be displayed through the pixels.

The switchable mirror panel 112 may include a liquid crystal and may be positioned on the display panel 111.

In this case, the timing controller 118 may control the source driver 114 and the gate driver 116, thereby adjusting reflectivity of the switchable mirror panel 112.

For example, the timing controller 118 may control the source driver 114 and the gate driver 116 to apply the voltage to the liquid crystal in a corresponding region so that a region of the switchable mirror panel 112 that is located in the region on the display panel 111, where the application is displayed, has a specific reflectivity.

Here, the specific reflectivity may be determined based on the reflectivity corresponding to the application, the location, size and the like at which the application is displayed, and this configuration is already described above in the various example embodiments.

Meanwhile, the processor 130 may control the timing controller 117 to display the application through the display panel 111, and control the timing controller 117 so that the region of the switchable mirror panel 112 that is located in the region on the display panel 111, where the application is displayed, has the specific reflectivity.

Figure 26:
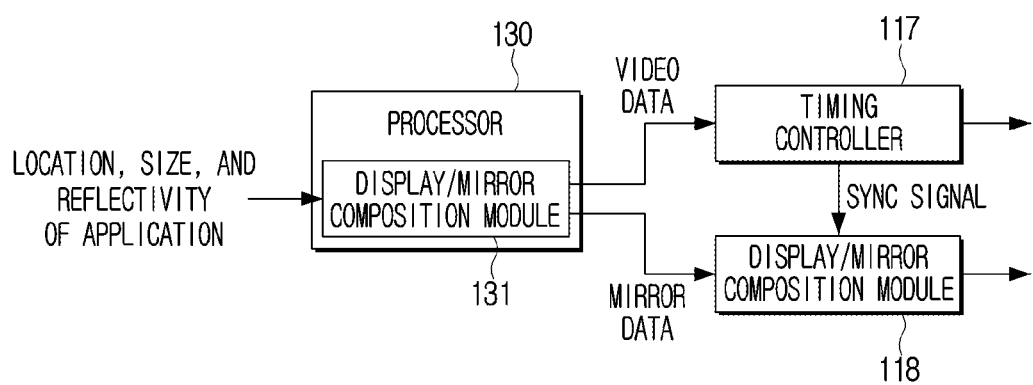
FIGS. 26 and 27 are views for explaining an example method of driving a display panel and a switchable mirror panel according to various embodiments.

To this end, as shown in FIG. 26, the processor 130 may control the display/mirror composition module 131.

Here, the display/mirror composition module 131 may refer to software stored in the memory 120, and generate data for controlling the timing controllers 117 and 118 based on data on the location, size, and reflectivity of the application.

For example, the display/mirror composition module 131 may generate video data and mirror data using data on the location, size, and/or reflectivity of the application when receiving the data, output the video data and transmit the same to the timing controller 117, and output the mirror data and transmit the same to the timing controller 118.

Here, the reflectivity of the application may be determined by the reflectivity corresponding to the application, stored in the memory 120, and the location, size, and the like at which the application is displayed. In addition, the location and size of the application may be determined by a default value or its location and size changed based on a user command.

In addition, video data may refer to control data for applying the voltage to the pixels in the region on the display panel 111, where the application is displayed, and the timing controller 117 may use the video data to control the source driver 113 and the gate driver 115.

In addition, the mirror data may refer to control data for driving the region of the switchable mirror panel 112 that is located in the region on the display panel 111, where the application is displayed, to have the specific reflectivity, and the timing controller 118 may use the mirror data to control the source driver 114 and the gate driver 116.

Figure 27:
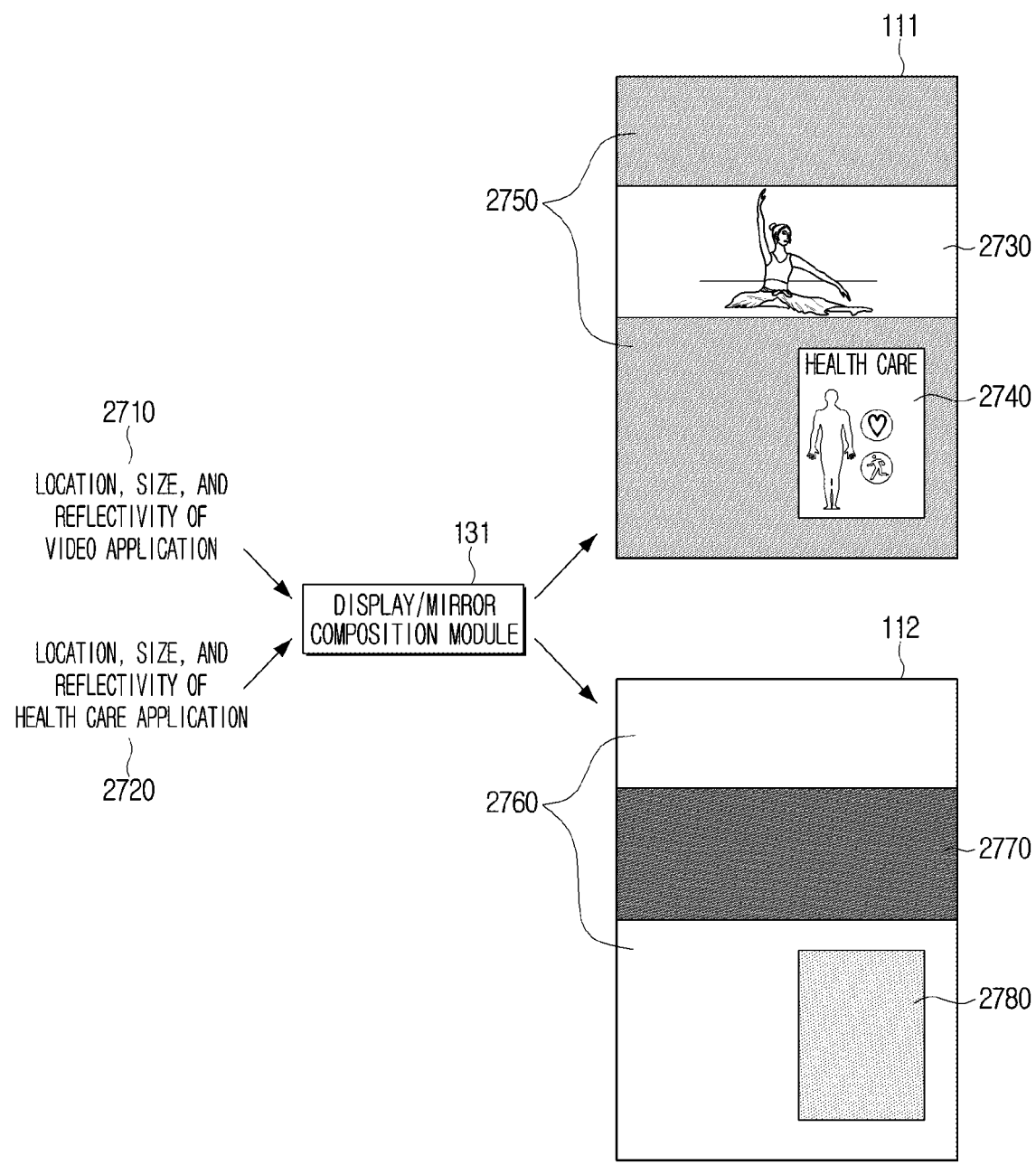

For example, as shown in FIG. 27, the display/mirror composition module 131 may use data 2710 on the location, size, and/or reflectivity of the video application to generate the video data and mirror data for driving the display panel 111 and the switchable mirror panel 112.

Accordingly, the video provided by the video application may be displayed in a region 2730 of the display panel 111, determined based on the location and size of the video application, and a corresponding region 2770 of the switchable mirror panel 112 may be driven to have a reflectivity of 0%.

In addition, the display/mirror composition module 131 may use data 2720 on the location, size, and reflectivity of a health care application to generate video data and mirror data for driving the display panel 111 and the switchable mirror panel 112.

Accordingly, the health-related information provided by the health care application may be displayed in a region 2740 of the display panel 111, determined based on the location and size of the health care application, and a corresponding region 2780 of the switchable mirror panel 112 may be driven to have a reflectivity of 50%.

Meanwhile, a region 2750 where the video or the health-related information is not displayed on the display panel 111 may not be driven. In addition, a remaining region 2760 other than the regions 2770 and 2780 on the switchable mirror panel 112 may be driven to have a reflectivity of 100%.

In this way, the processor 130 may adjust the reflectivity of the region on the mirror display 110, where the application is displayed, for each application.

Figure 28:
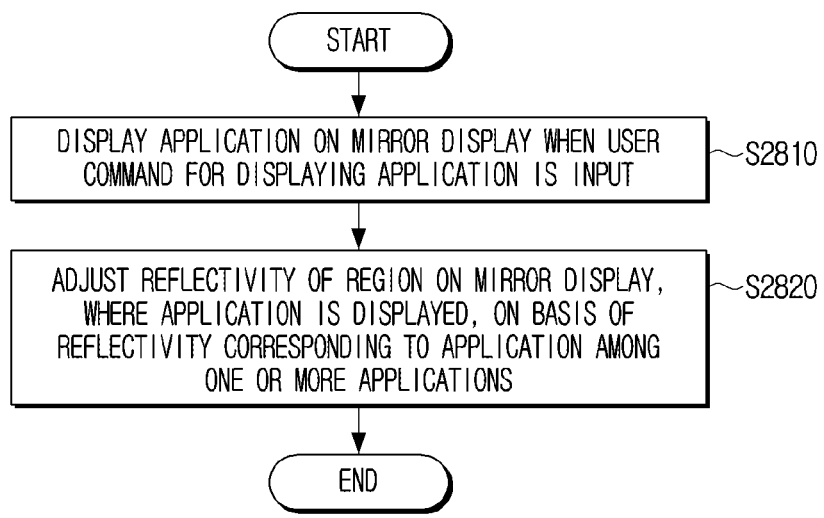
FIG. 28 is a flowchart for explaining an example method for controlling a display apparatus according to various embodiments.

FIG. 28 is a flowchart illustrating an example method for controlling an example display apparatus according to various embodiments.

The display apparatus may include a mirror display having adjusted reflectivity. In addition, the display apparatus may store information on reflectivity corresponding to an application for each of one or more applications.

In this case, the display apparatus may display an application on the mirror display when receiving a user command for displaying the application (S2810).

The display apparatus may then adjust reflectivity of a region on the mirror display, where the application is displayed, based on the reflectivity corresponding to the application among the one or more applications, based on the information on the reflectivity corresponding to the application for each of the one or more applications (S2820).

Here, the display apparatus may store information on reflectivity corresponding to a first application and information on reflectivity corresponding to a second application. In this case, in the operation S2810, the first and second applications may respectively be displayed on the mirror display, and in the operation S2820, the (first) region where the first application is displayed on the mirror display may have the adjusted reflectivity based on the reflectivity corresponding to the first application, and the (second) region where the second application is displayed on the mirror display may have the adjusted reflectivity based on the reflectivity corresponding to the second application. Here, the reflectivity corresponding to the first application may be different from the reflectivity corresponding to the second application.

Meanwhile, in the operation S2820, the region where the application is displayed may have adjusted reflectivity based on the reflectivity corresponding to the application and location of the region where the application is displayed.

Here, the region where the application is displayed may have adjusted reflectivity based on the reflectivity corresponding to the application when the application is displayed in an edge region of the mirror display, and the region where the application is displayed may have the adjusted reflectivity based on a predetermined reflectivity when the application is displayed in a central region of the mirror display, and the reflectivity corresponding to the application is smaller than the predetermined reflectivity.

Meanwhile, in the operation S2820, the region where the application is displayed may have adjusted reflectivity based on the reflectivity corresponding to the application and a size of the region where the application is displayed.

Here, the region where the application is displayed may have adjusted reflectivity based on the reflectivity corresponding to the application when the application is displayed on the mirror display while having a size smaller than a predetermined size, and the region where the application is displayed may have adjusted reflectivity based on the predetermined reflectivity when the application is displayed on the mirror display while having a size of the predetermined size or larger, and the reflectivity corresponding to the application is smaller than a predetermined reflectivity.

Meanwhile, the application may be displayed in another region when a user command for moving the application to another region on the mirror display is input, and the region where the application is displayed may have adjusted reflectivity based on the reflectivity corresponding to the application and the location of the region on the mirror display, where the application is moved.

In addition, a size of the application may be changed and displayed when a user command for changing the size of the region where the application is displayed is input, and the region where the application is displayed may have adjusted reflectivity based on the reflectivity corresponding to the application and the size of the changed application.

Meanwhile, the mirror display may have the reflectivity adjusted for a plurality of reflective regions.

In this case, the region where the application is displayed may be determined among the plurality of regions based on the location and size of the application to be displayed, the application may be displayed in the determined region, and the determined region may have adjusted reflectivity based on the reflectivity corresponding to the application.

For example, a matched region may be determined as a region where the application is displayed when it is determined that the display region of the application, determined based on the location and size of the application to be displayed, matches with at least one region among a plurality of regions; and at least one of the location and/or size of the display region of the application may be changed for the display region of the application to match with at least one region among the plurality of regions when it is determined that the display region of the application does not match with at least one region among the plurality of regions, and the changed display region may be determined as the region where the application is displayed.

Meanwhile, various examples described above according to an embodiment of the disclosure may be implemented by software including an instruction stored in a machine-readable storage medium (for example, a computer-readable storage medium). A machine may be a device that invokes the stored instruction from the storage medium and may be operated based on the invoked instruction, and may include the apparatus according to the disclosed embodiments. In a case in which the instruction is executed by the processor, the processor may directly perform a function corresponding to the instruction or other components may perform the function corresponding to the instruction under a control of the processor. The instruction may include code provided or executed by a compiler or an interpreter. The machine-readable storage medium may be provided in the form of a non-transitory storage medium. Here, the "non-transitory storage medium" may refer to a tangible device and only indicates that this storage medium does not include a signal (e.g., electromagnetic wave), and this term does not distinguish a case where data is stored semi-permanently in the storage medium and a case where data is temporarily stored in the storage medium from each other. For example, the "non-transitory storage medium" may include a buffer in which data is temporarily stored.

According to an embodiment, the methods according to the various examples disclosed in the present disclosure may be included and provided in a computer program product. The computer program product may be traded as a product between a seller and a purchaser. The computer program product may be distributed in a form of the storage medium (for example, a compact disc read only memory (CD-ROM)) that may be read by a machine, or may be distributed online (for example, downloaded or uploaded) through an application store (for example, PlayStore™) or directly between two user devices (for example, smartphones). In a case of online distribution, at least a portion of the computer program product (e.g., downloadable app) may be at least temporarily stored in the machine-readable storage medium such as a memory of a server of a manufacturer, a server of an application store or a relay server, or be temporarily provided.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display apparatus comprising:
a mirror display having adjustable reflectivity;
memory; and
at least one processor configured to:
receive a user command for an application to be displayed,
determine a region on the mirror display for displaying the to-be-displayed application based on a location and a size of the to-be-displayed application,
display the application in the determined region, and
adjust reflectivity of the determined region on the mirror display, where the application is displayed, based on reflectivity corresponding to the application and a size of the determined region.

2. The display apparatus of claim 1, wherein the memory stores information on reflectivity corresponding to a first application and reflectivity corresponding to a second application, and
at least one processor is configured to:
display the first and second applications on the mirror display, respectively,
adjust reflectivity of a region on the mirror display, where the first application is displayed, based on the reflectivity corresponding to the first application, and
adjust reflectivity of a region on the mirror display, where the second application is displayed, based on the reflectivity corresponding to the second application, and
the reflectivity corresponding to the first application is different from the reflectivity corresponding to the second application.

3. The display apparatus of claim 1, wherein at least one processor is configured to:
adjust the reflectivity of the determined region where the application is displayed based on the reflectivity corresponding to the application when the application is displayed in an edge region of the mirror display, and
adjust the reflectivity of the determined region where the application is displayed based on a predetermined reflectivity when the application is displayed in a central region of the mirror display, and the reflectivity corresponding to the application is smaller than the predetermined reflectivity.

4. The display apparatus of claim 1, wherein at least one processor is configured to:
adjust the reflectivity of the determined region where the application is displayed based on the reflectivity corresponding to the application when the application is displayed on the mirror display while having a size smaller than a predetermined size, and
adjust the reflectivity of the determined region where the application is displayed based on a predetermined reflectivity when the application is displayed on the mirror display while having a size of the predetermined size or larger, and the reflectivity corresponding to the application is smaller than the predetermined reflectivity.

5. The display apparatus of claim 1, wherein at least one processor is configured to display the application in another region according to a user command when receiving the user command for moving the application to another region of the mirror display, and adjust the reflectivity of the region where the application is displayed based on the reflectivity corresponding to the application and a location of the other region on the mirror display, to which the application is moved.

6. The display apparatus of claim 1, wherein at least one processor is configured to change the display size of the application when receiving a user command for changing a size of the region where the application is displayed, and adjust the reflectivity of the region where the application is displayed based on the reflectivity corresponding to the application and the changed size of the application.

7. The display apparatus of claim 1, wherein the mirror display has reflectivity adjusted for a plurality of reflective regions, and
at least one processor is configured to determine the region where the application is displayed from among a plurality of reflective regions.

8. The display apparatus of claim 7, wherein at least one processor is configured to determine, as a matched region, the determined region when the determined region matches with at least one region among the plurality of regions, and change at least one of the location or size of the display region of the application for the display region of the application to match with at least one region among the plurality of regions when the determined region of the application does not match with at least one region among the plurality of regions, and display the application in the changed display region.

9. A method for controlling a display apparatus that includes a mirror display having adjustable reflectivity, the method comprising:

receiving a user command for an application to be displayed;

determining a region on the mirror display for displaying the to-be-displayed application based on a location and a size of the to-be-displayed application;

displaying the application in the determined region; and adjusting reflectivity of the determined region on the mirror display, where the application is displayed, based on reflectivity corresponding to the application and a size of the determined region.

10. The method of claim 9, wherein the display apparatus stores information on reflectivity corresponding to a first application and reflectivity corresponding to a second application, in the displaying, the first and second applications are displayed on the mirror display, respectively, and in the adjusting, a region on the mirror display, where the first application is displayed, has adjusted reflectivity based on the reflectivity corresponding to the first application, and a region on the mirror display, where the second application is displayed, has adjusted reflectivity based on the reflectivity corresponding to the second application, and the reflectivity corresponding to the first application is different from the reflectivity corresponding to the second application.

11. The method of claim 10, wherein, in the adjusting, the determined region where the application is displayed has adjusted reflectivity based on the reflectivity corresponding to the application when the application is displayed in an edge region of the mirror display, and the determined region where the application is displayed has adjusted reflectivity based on a predetermined reflectivity when the application is displayed in a central region of the mirror display, and the reflectivity corresponding to the application is smaller than the predetermined reflectivity.

12. One or more non-transitory computer-readable storage media storing instructions which, when executed by at least processor, cause the at least one processor to perform operations comprising:

receiving a user command for an application to be displayed;

determining a region on a mirror display for displaying the to-be-displayed application based on a location and a size of the to-be-displayed application;

displaying the application in the determined region; and adjusting reflectivity of the determined region on the mirror display, where the application is displayed, based on reflectivity corresponding to the application and a size of the determined region.

13. An electronic device comprising the one or more non-transitory computer-readable storage media of claim 12.

* * * * *